US012787902B2

(12) United States Patent
Shindo et al.

(10) Patent No.: US 12,787,902 B2
(45) Date of Patent: Nov. 10, 2026

(54) WORKING MACHINE

(71) Applicant: MAKITA CORPORATION, Anjo (JP)

(72) Inventors: Kunito Shindo, Anjo (JP); Takayoshi Iio, Anjo (JP); Yuuta Matsuura, Anjo (JP); Takashi Kumagai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 351 days.

(21) Appl. No.: 18/500,439

(22) Filed: Nov. 2, 2023

(65) Prior Publication Data

US 2024/0147884 A1 May 9, 2024

(30) Foreign Application Priority Data

Nov. 7, 2022 (JP) ................................ 2022-178124
Nov. 7, 2022 (JP) ................................ 2022-178126

(51) Int. Cl.
*A01B 33/02* (2006.01)
*A01B 33/08* (2006.01)
(Continued)

(52) U.S. Cl.
CPC .......... *A01B 33/028* (2013.01); *A01B 33/082* (2013.01); *H02K 5/207* (2021.01);
(Continued)

(58) Field of Classification Search
CPC ... A01B 33/028; A01B 33/082; A01B 33/022; H02K 5/207; H02K 9/06; H02K 11/0094; H02K 21/22
See application file for complete search history.

(56) References Cited

U.S. PATENT DOCUMENTS 8,627,897 B2 * 1/2014 Marcil ................ A01B 33/082 172/42
8,991,514 B2 * 3/2015 Tozawa ................ A01B 33/028 172/42
(Continued)

FOREIGN PATENT DOCUMENTS

CN 201967312 U 9/2011
CN 102948272 A 3/2013
(Continued)

OTHER PUBLICATIONS

Communication dated May 19, 2026, issued in Japanese Application No. 2022-178124.
(Continued)

*Primary Examiner* — Robert E Pezzuto
(74) *Attorney, Agent, or Firm* — Sughrue Mion, PLLC

(57) ABSTRACT

A working machine may work by moving frontward on a ground. The working machine may include: a battery; an electric motor comprising a stator and a rotor and configured to be driven by electric power supplied from the battery; a working unit configured to work on the ground by being rotated about a rotary axis by the electric motor, the rotary axis being substantially parallel to a virtual ground perpendicular to an up-down direction; and a transmitting unit configured to transmit rotation of the electric motor to the working unit. When the working machine is viewed from a front side with the working machine being in a working posture, the battery, the electric motor, and the working unit may be separate from each other in the up-down direction and the working unit may be disposed below the battery and the electric motor.

20 Claims, 21 Drawing Sheets

(51) Int. Cl.

| | |
|---|---|
| ***H02K 5/20*** | (2006.01) |
| ***H02K 9/06*** | (2006.01) |
| ***H02K 11/00*** | (2016.01) |
| ***H02K 21/22*** | (2006.01) |

(52) U.S. Cl.

CPC ........... *H02K 9/06* (2013.01); *H02K 11/0094* (2013.01); *H02K 21/22* (2013.01); *A01B 33/022* (2013.01)

(56) References Cited

U.S. PATENT DOCUMENTS

| | | | | |
|---|---|---|---|---|
| 11,617,301 | B2 * | 4/2023 | Feng ...................... | A01D 34/68 56/11.9 |
| 2003/0178208 | A1 | 9/2003 | Abenroth et al. | |
| 2004/0194982 | A1 | 10/2004 | Fukuzumi et al. | |
| 2013/0049477 | A1 | 2/2013 | Tozawa et al. | |
| 2021/0143710 | A1 | 5/2021 | Sprague et al. | |
| 2021/0184535 | A1 | 6/2021 | Mizuguchi et al. | |
| 2022/0174869 | A1 | 6/2022 | Kutsuna | |
| 2023/0034464 | A1 | 2/2023 | Matsunaga et al. | |
| 2024/0381801 | A1 * | 11/2024 | Mould ................. | A01B 33/028 |

FOREIGN PATENT DOCUMENTS

| | | | |
|---|---|---|---|
| CN | 107343397 | A | 11/2017 |
| CN | 114867915 | A | 8/2022 |
| JP | 6-26401 | U | 4/1994 |
| JP | 10-271901 | A | 10/1998 |
| JP | 11-168901 | A | 6/1999 |
| JP | 2004-275102 | A | 10/2004 |
| JP | 2004-276800 | A | 10/2004 |
| JP | 2006-158318 | A | 6/2006 |
| JP | 2008-141992 | A | 6/2008 |
| JP | 2013-42672 | A | 3/2013 |
| JP | 2014-113107 | A | 6/2014 |
| JP | 2014-239660 | A | 12/2014 |
| JP | 2020-68703 | A | 5/2020 |
| JP | 2022-91273 | A | 6/2022 |
| WO | 2020/049617 | A1 | 3/2020 |

OTHER PUBLICATIONS

Communication dated May 19, 2026, issued in Japanese Application No. 2022-178126.

Communication dated Jun. 4, 2026, issued in Chinese Application No. 202311452418.1.

* cited by examiner

WORKING MACHINE

REFERENCE TO RELATED APPLICATIONS

This application claims priority to Japanese Patent Application No. 2022-178124, filed on Nov. 7, 2022 and Japanese Patent Application No. 2022-178126, filed on Nov. 7, 2022, the entire contents of which are hereby incorporated by reference into the present application.

TECHNICAL FIELD

This disclosure herewith relates to a working machine.

BACKGROUND ART

Japanese Patent Application Publication No. H11-168901 describes a working machine. The working machine includes: a battery; an electric motor including a stator and a rotor and configured to be driven by electric power supplied from the battery; and a working unit configured to rotate about a rotary axis by the electric motor, the rotary axis being substantially parallel to a virtual ground perpendicular to an up-down direction. When the working machine is viewed from a front side with the working machine being in a working posture, the working unit is disposed below the battery.

DESCRIPTION

In the above working machine, a force by self-weight of the battery is applied on the working unit as a sole force applied thereon. Due to this, the working unit may lift off from a ground. The present teachings provide an art that suppresses a working unit from lifting off from a ground.

A working machine disclosed herein may be configured to work by moving frontward on a ground. The working machine may comprise: a battery; an electric motor comprising a stator and a rotor and configured to be driven by electric power supplied from the battery; a working unit configured to work on the ground by being rotated about a rotary axis by the electric motor, the rotary axis being substantially parallel to a virtual ground perpendicular to an up-down direction; and a transmitting unit configured to transmit rotation of the electric motor to the working unit. When the working machine is viewed from a front side with the working machine being in a working posture on the ground, the battery, the electric motor, and the working unit may be separate from each other in the up-down direction and the working unit may be disposed below the battery and the electric motor.

According to the above configuration, both of the force by the self-weight of the battery and a force by self-weight of the electric motor act on the working unit. Due to this, the working unit can be suppressed from lifting off from the ground.

Figure 6:
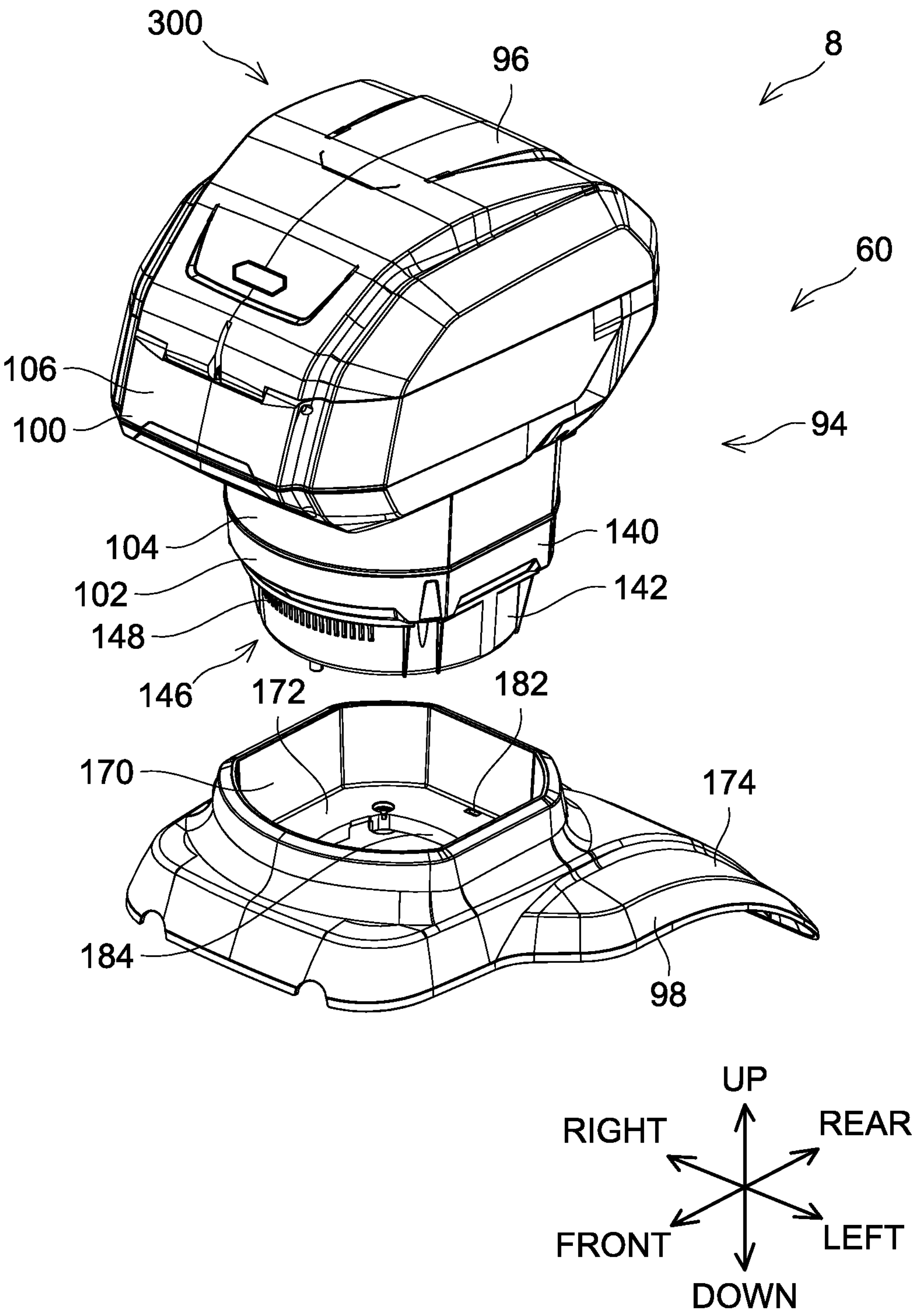

FIG. 6 illustrates a perspective, exploded view of a body housing 94, a cover 96, and a fender 98 according to the embodiment.

Figure 7:
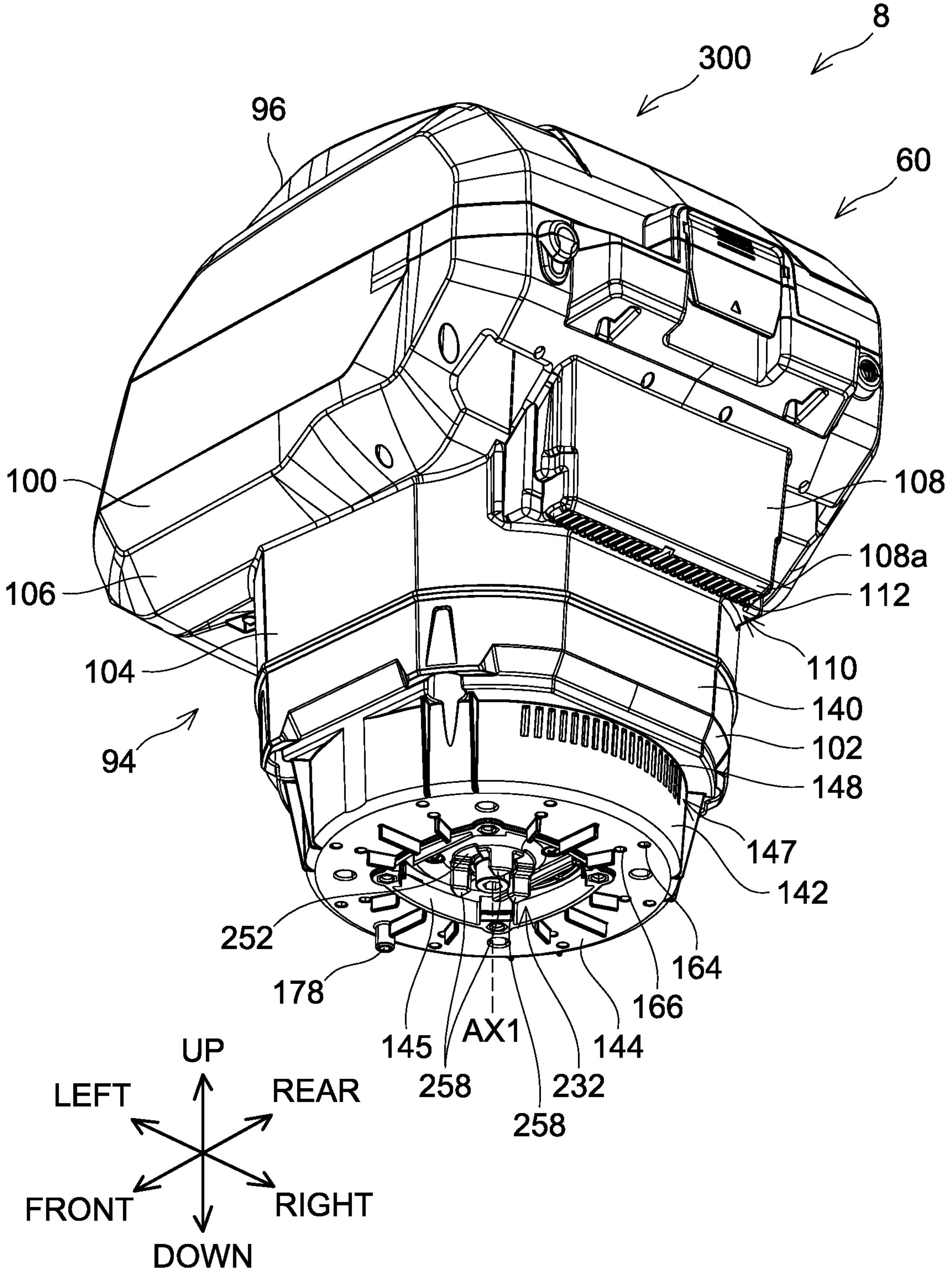

FIG. 7 illustrates a perspective view of the body housing 94 and the cover 96.

Figure 8:
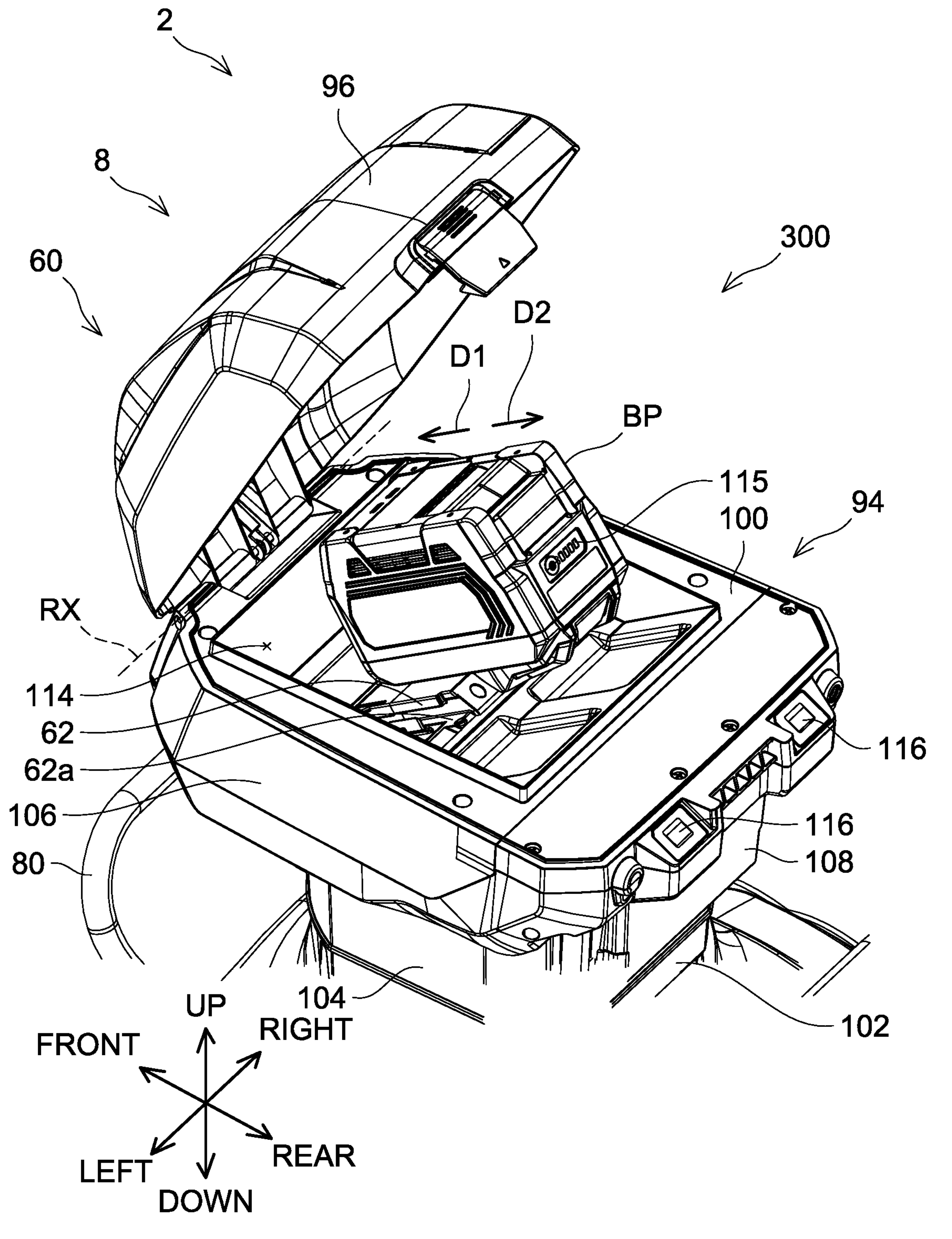

FIG. 8 illustrates a perspective view of the working machine 2 according to the embodiment, with the cover 96 in an open position.

Figure 9:
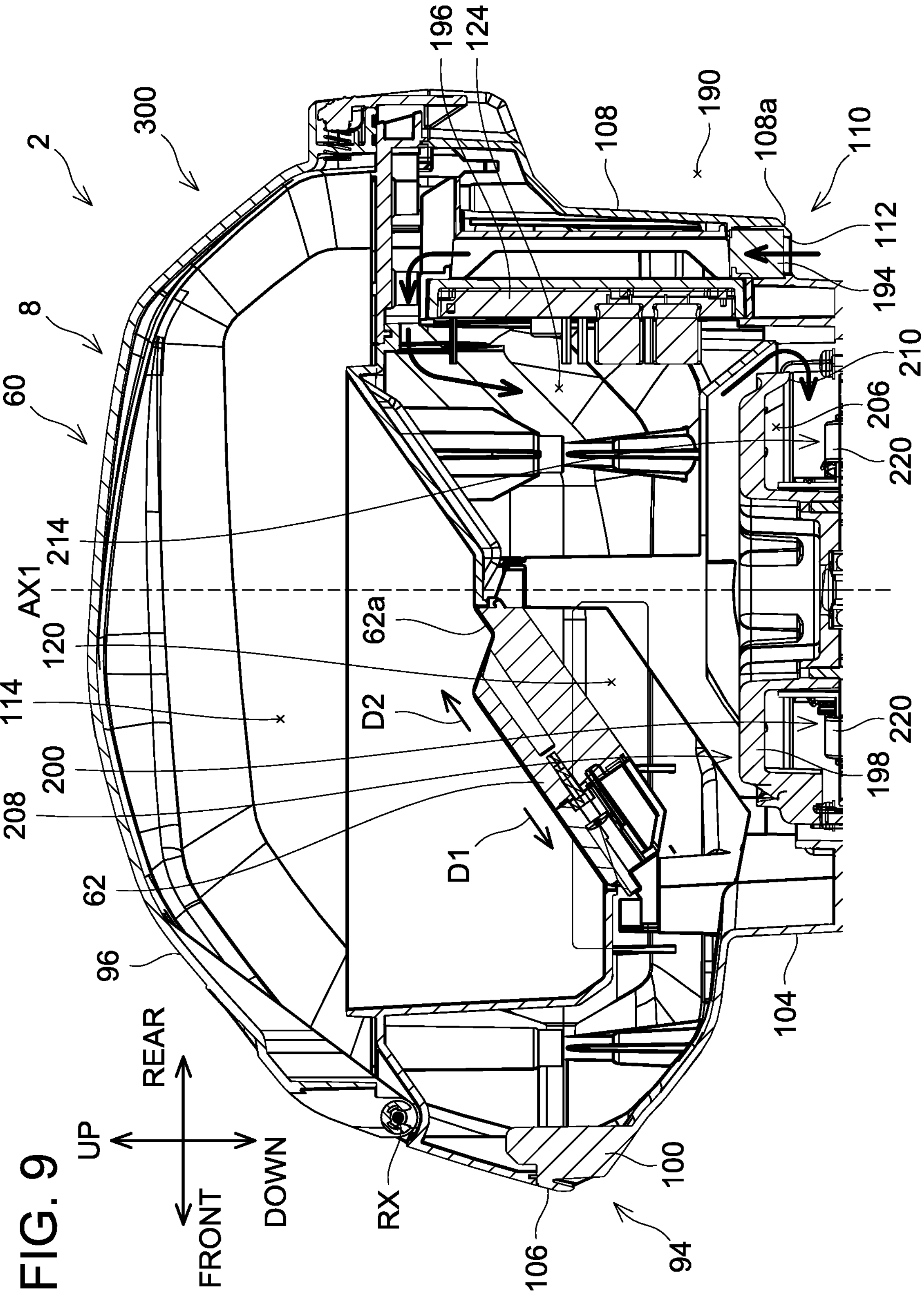

FIG. 9 illustrates a cross-sectional view of the working machine 2 according to the embodiment, seeing a battery attaching unit 62 and a vicinity thereof.

Figure 10:
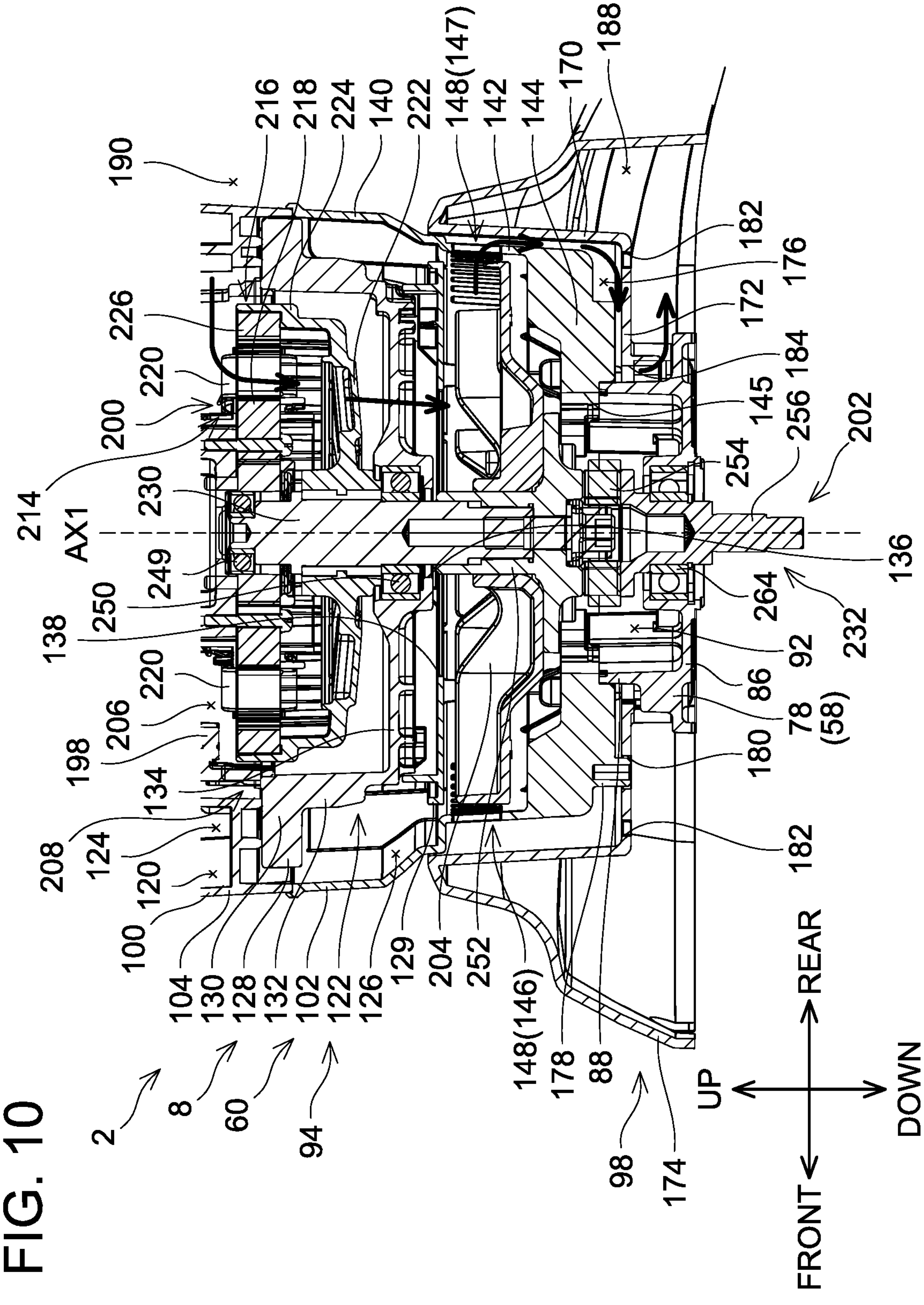

FIG. 10 illustrates a cross-sectional view of a body unit 8 according to the embodiment, seeing a fan 204 and a vicinity thereof with a first transmission casing 76 and a front handle 80 removed.

Figure 11:
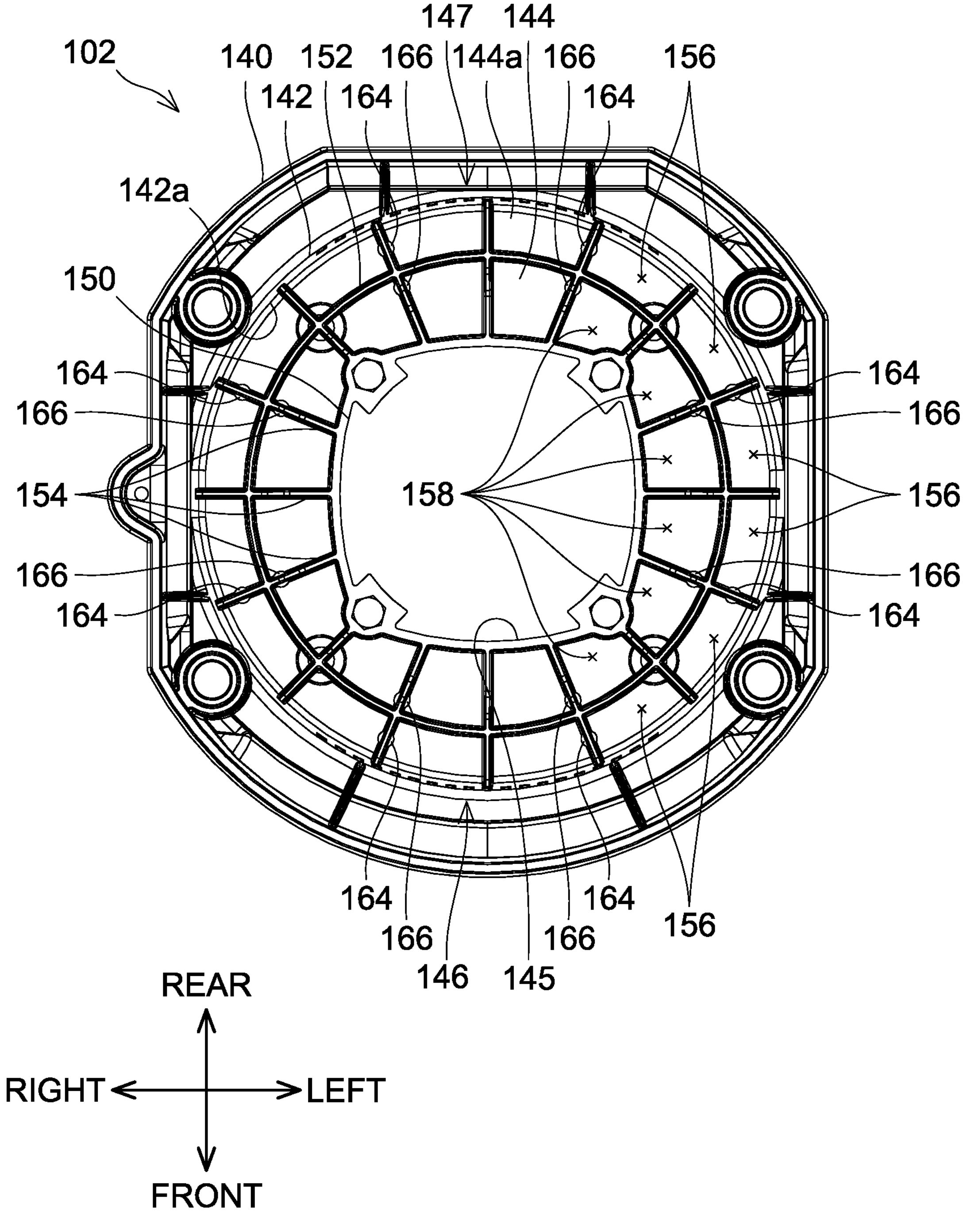

FIG. 11 illustrates a top view of a lower body housing 102 according to the embodiment.

Figure 12:
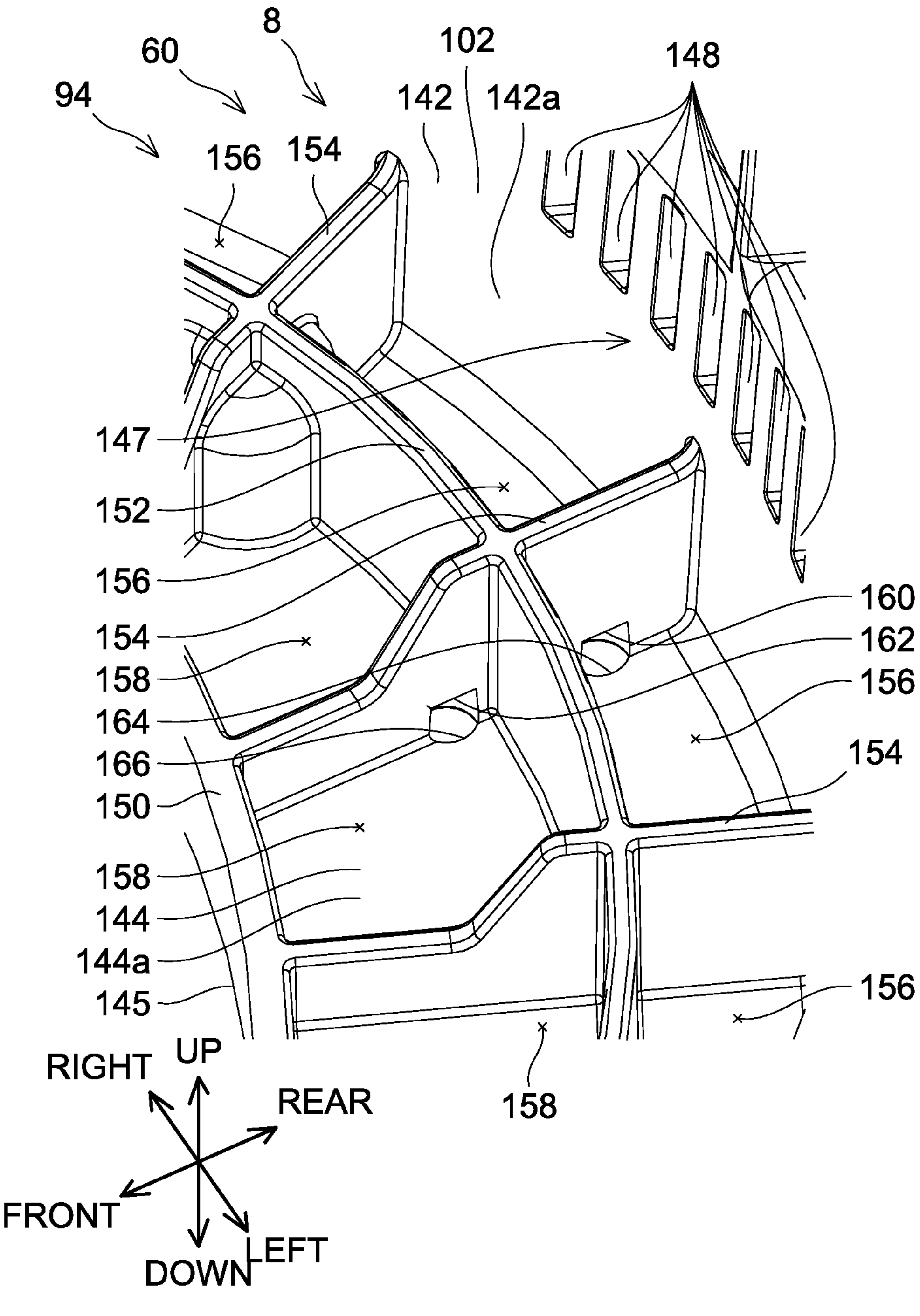

FIG. 12 illustrates a perspective view of the lower body housing 102 according to the embodiment.

Figure 13:
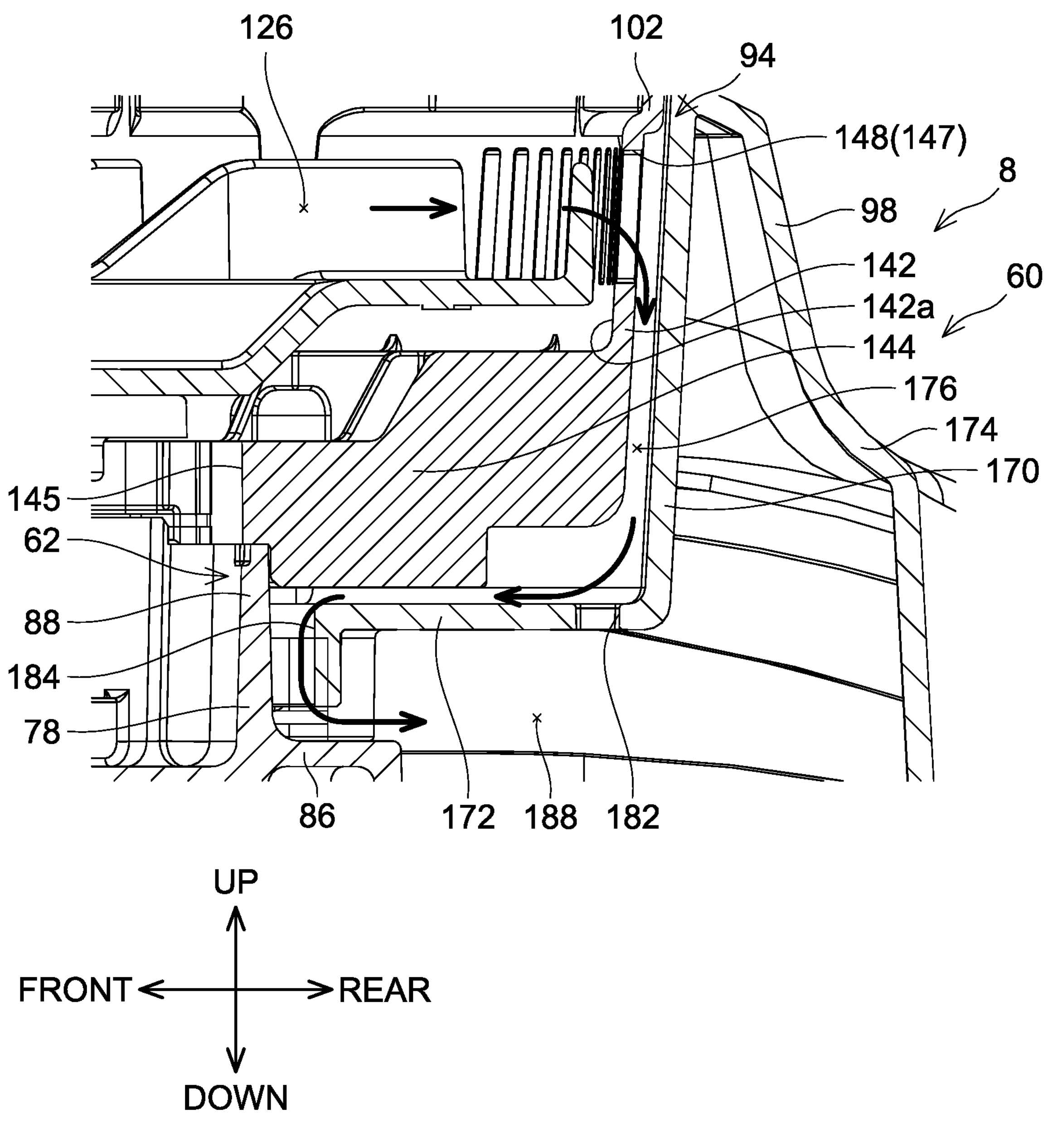

FIG. 13 illustrates a cross-sectional view of the working machine 2 according to the embodiment, seeing an air outlet 184 and a vicinity thereof.

Figure 14:
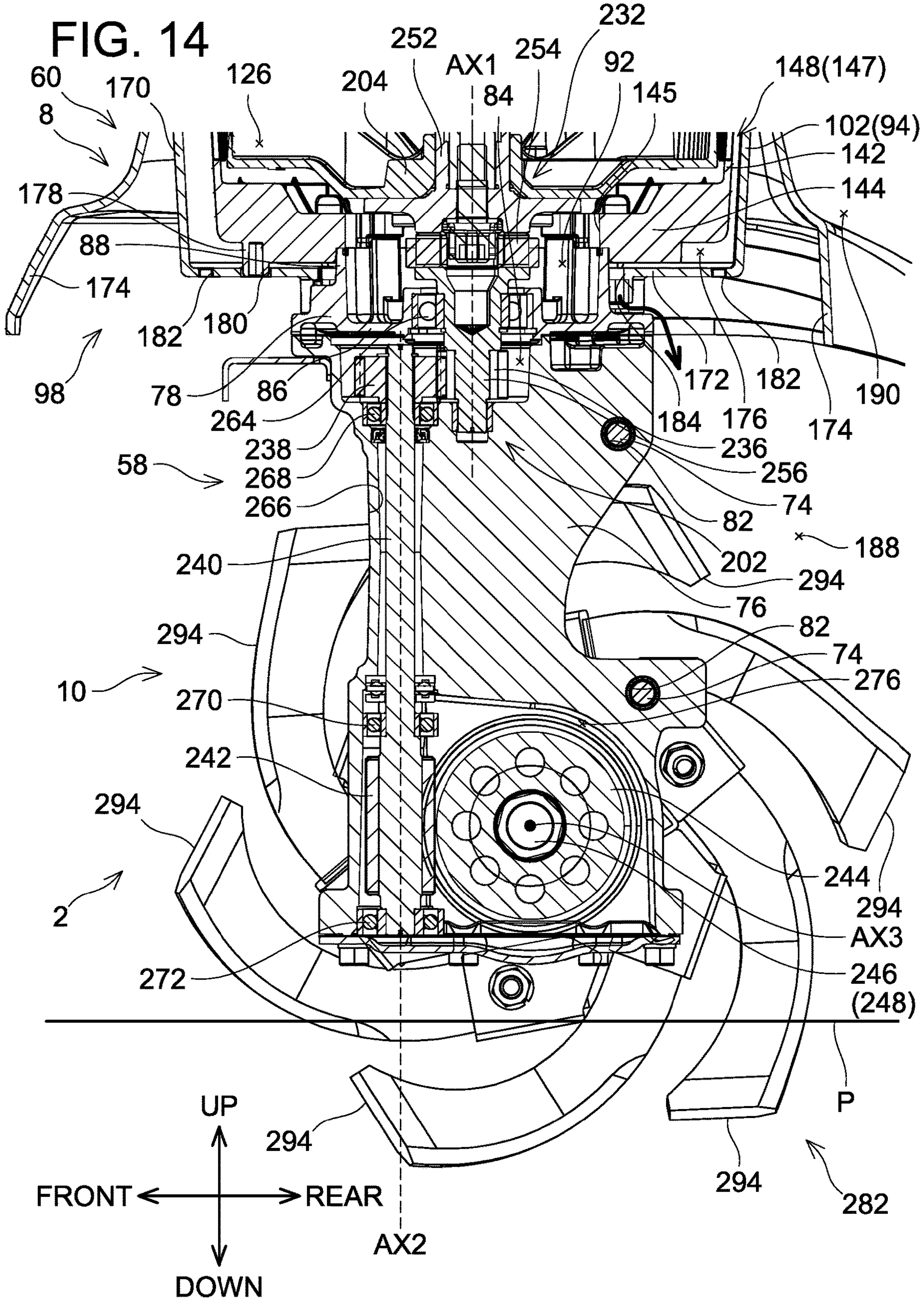

FIG. 14 illustrates a cross-sectional view of the working machine 2 according to the embodiment, seeing the working unit 10 and a vicinity thereof.

Figure 15:
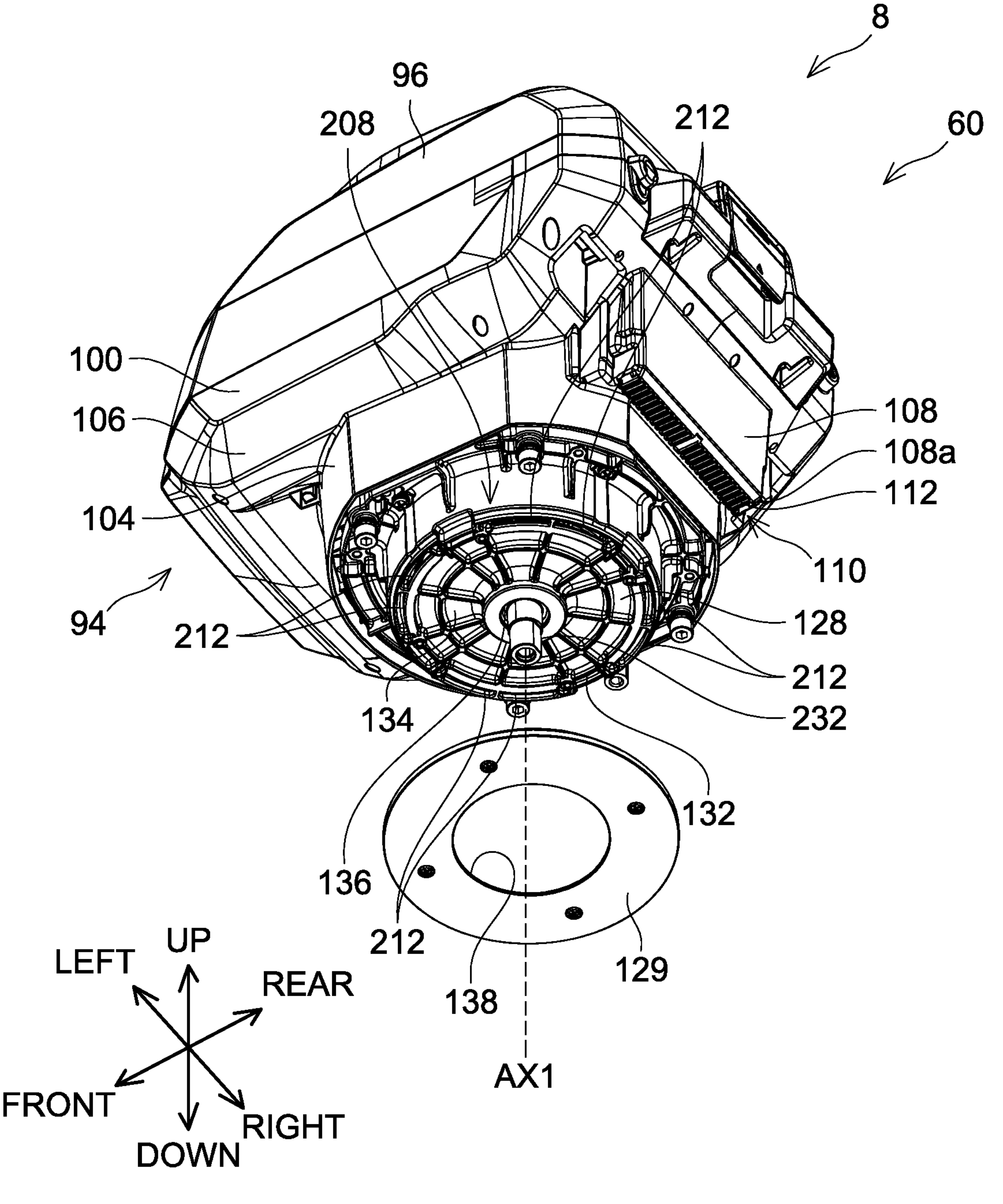

FIG. 15 illustrates a perspective, exploded view of the body unit 8 according to the embodiment, with the transmission casing unit 58 and the lower body housing 102 removed.

Figure 16:
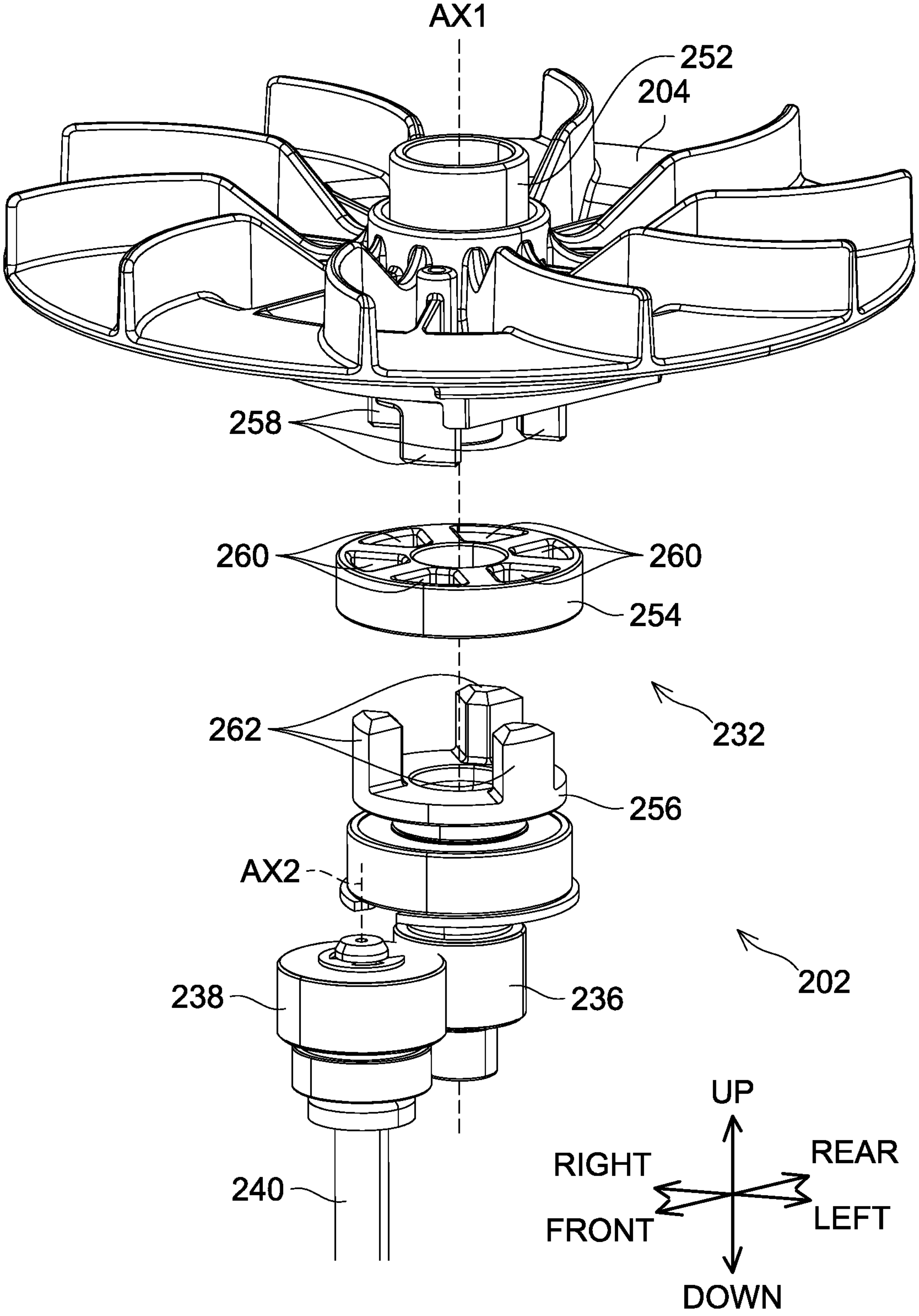

FIG. 16 illustrates a perspective, exploded view of a transmitting unit 202 and a fan 204 according to the embodiment.

Figure 17:
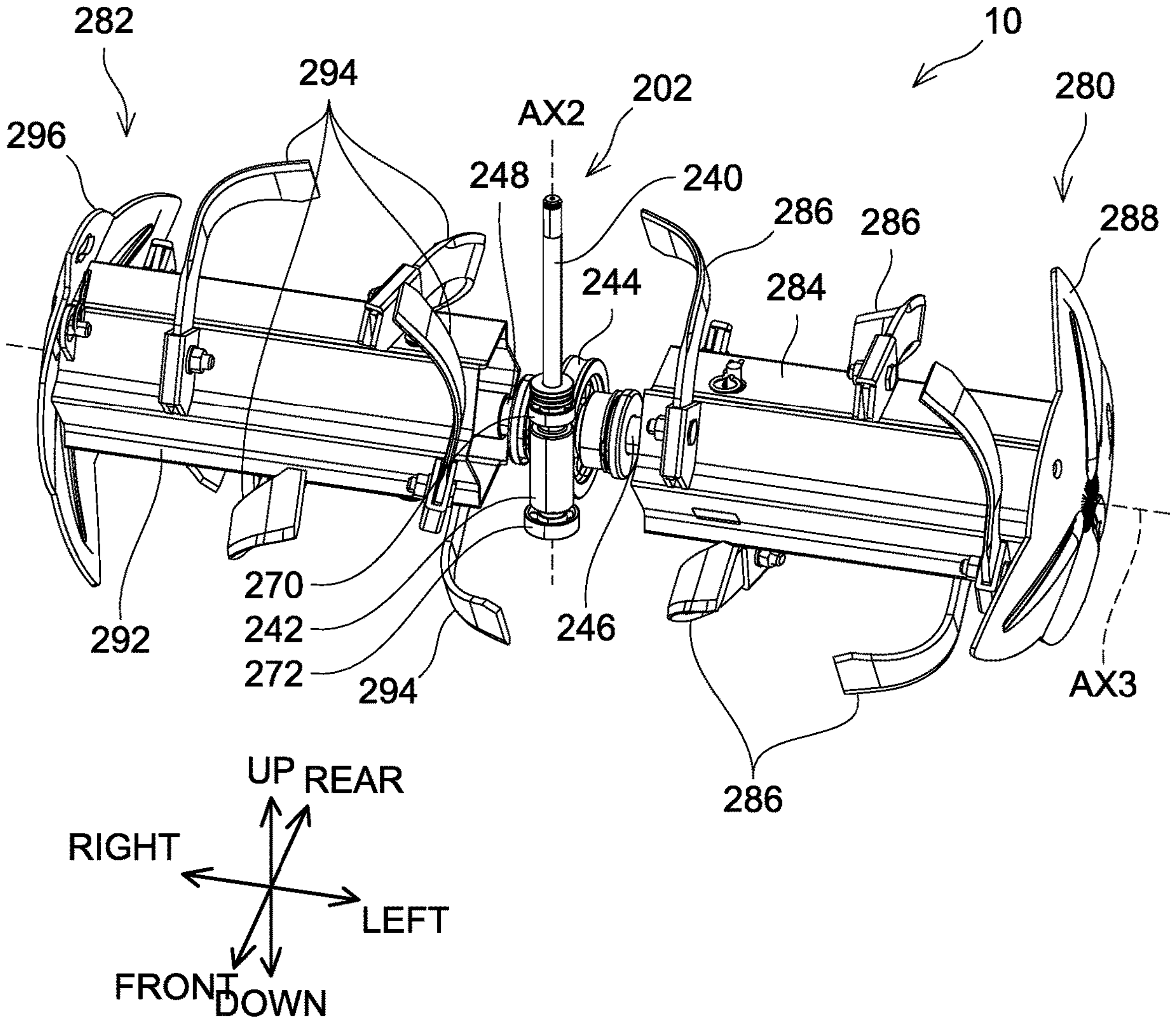

FIG. 17 illustrates a perspective view of the working unit 10 and the transmitting unit 202 according to the embodiment.

Figure 18:
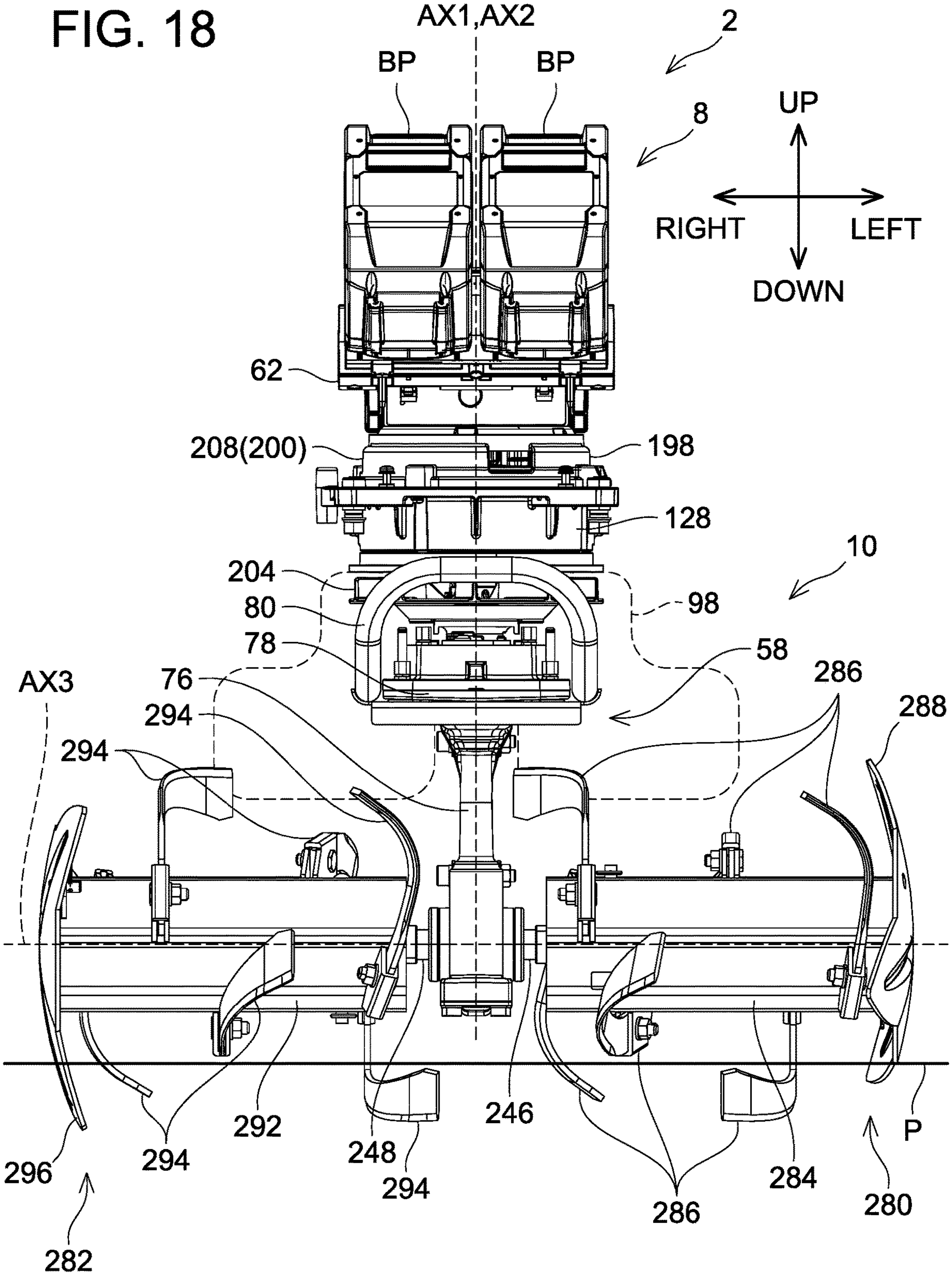

FIG. 18 illustrates a front view showing a positional relationship between battery packs BP, the working unit 10, the battery attaching unit 62, the fan 204, and a motor casing 208 according to the embodiment.

Figure 19:
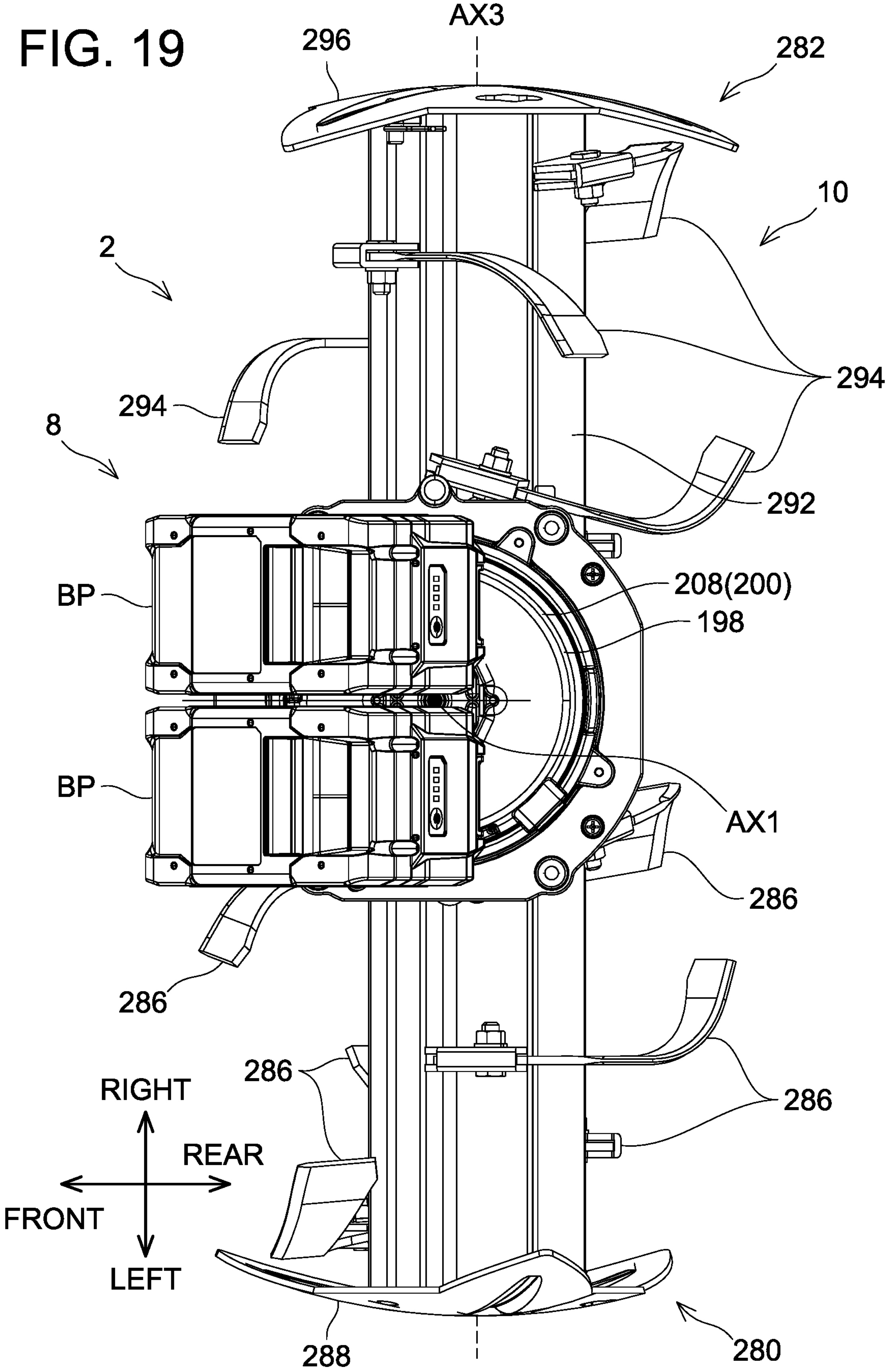

FIG. 19 illustrates a top view showing a positional relationship between the battery packs BP, the working unit 10, and the motor casing 208 according to the embodiment.

Figure 20:
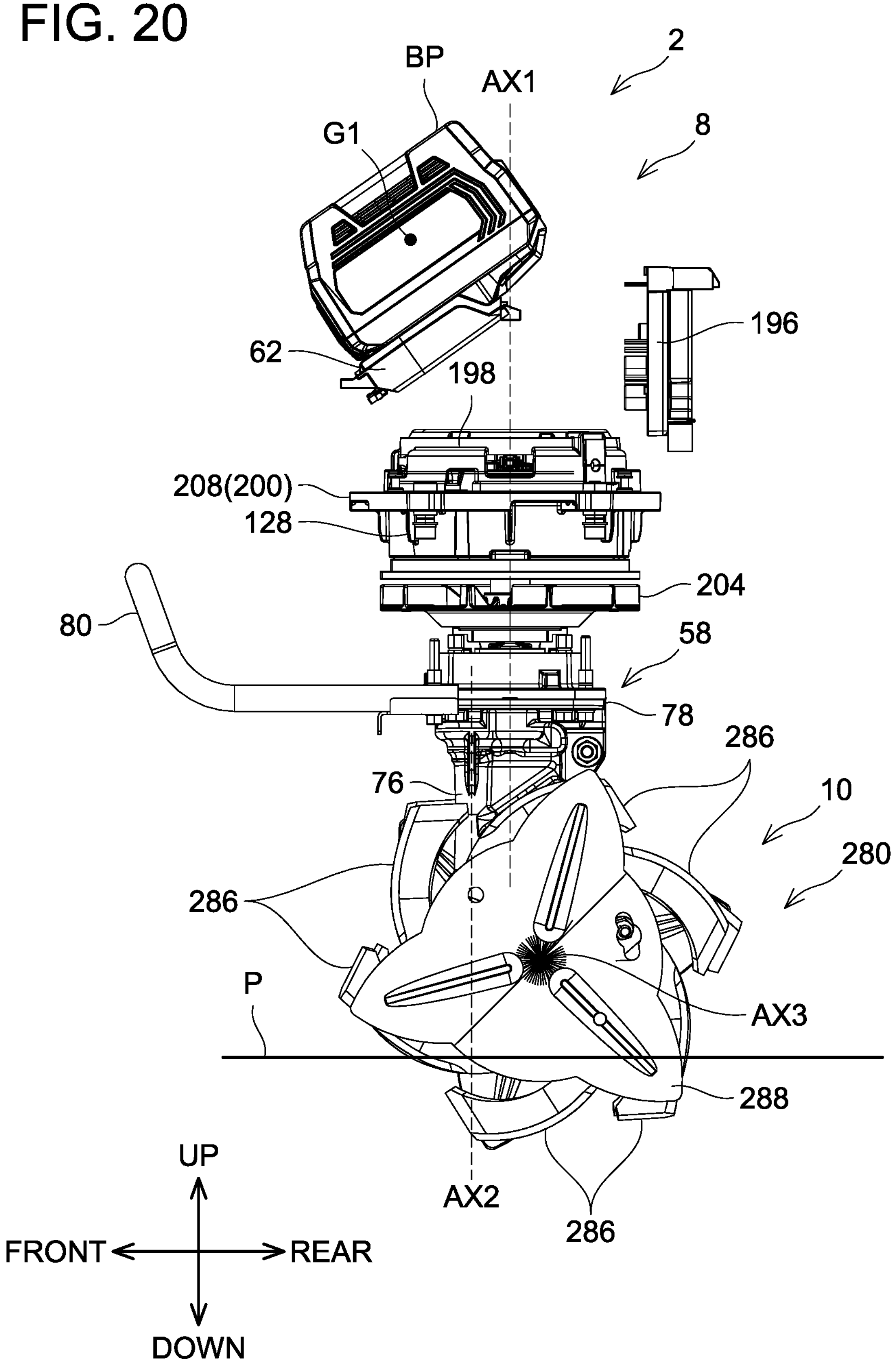

FIG. 20 illustrates a left view showing a positional relationship between the battery packs BP, the working unit 10, the battery attaching unit 62, a control unit 196, the fan 204, and the motor casing 208 according to the embodiment.

Figure 21:
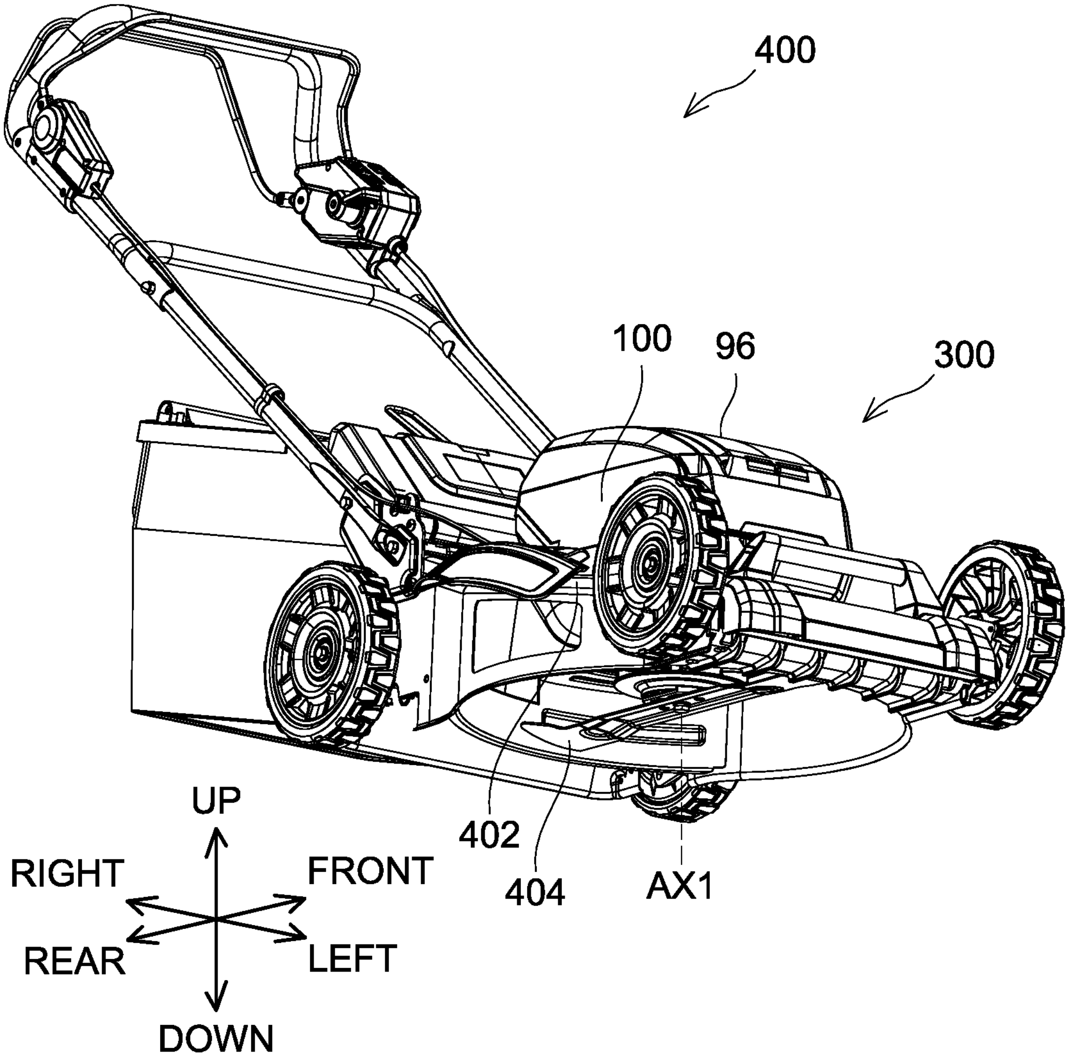

FIG. 21 illustrates a perspective view of a lawn mower 400 according to the embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the transmitting unit may comprise: a first transmitting shaft configured to be rotated by the electric motor; a jaw coupler connected to the first transmitting shaft; and a second transmitting shaft configured to transmit rotation of the first transmitting shaft to the working unit via the jaw coupler.

According to the above configuration, combination of the electric motor and the working unit can be easily changed by using the jaw coupler.

In one or more embodiments, the jaw coupler may comprise a coupling member constituted of a resin material.

According to the above configuration, vibration of the first transmitting shaft and vibration of the second transmitting shaft can be reduced by the coupling member.

In one or more embodiments, the working machine may further comprise: a body housing accommodating the electric motor; and a battery attaching unit attached to the body housing and to which the battery is detachably attached. An attaching direction in which the battery is attached to the battery attaching unit may be inclined relative to the virtual ground and may be oriented toward the ground.

According to the above configuration, the user can easily attach and detach the battery to and from the battery attaching unit.

In one or more embodiments, the working machine may further comprise a cover attached to the body housing and configured to pivot between a closed position and an open position, the cover defining a battery accommodating space in which the battery is accommodated between the body housing and the cover when the cover is in the closed position. The cover may open from a rear side toward the front side when the cover pivot s from the closed position toward the open position about a pivot axis of the cover.

According to the above configuration, the user can easily attach and detach the battery to and from the battery attaching unit when the user is standing behind the working machine and pivots the cover from the closed position to the open position.

In one or more embodiments, a center of gravity of the battery may be disposed on the front side relative to a rotary axis of the rotor when the working machine is on the ground in the working posture.

According to the above configuration, the working machine can be suppressed from tilting rearward.

In one or more embodiments, a center of gravity of the battery may be disposed on the front side relative to the rotary axis of the working unit when the working machine is on the ground in the working posture.

According to the above configuration, the working machine can be suppressed from tilting rearward due to the vibration of the working unit.

In one or more embodiments, the working machine may further comprise a handle unit configured to be gripped by a user. The working machine may be a walk behind working machine configured to be moved by the user pushing the handle unit frontward.

Generally, in a walk behind working machine, maneuverability by the user of the working machine deteriorates when the working unit lifts off from the ground. According to the above configuration, since the working unit can be suppressed from lifting off from the ground, deterioration in the maneuverability can be suppressed.

In one or more embodiments, the working machine may further comprise: a fan configured to be rotated by the electric motor; and a housing unit accommodating the electric motor and the fan. The transmitting unit may comprise an axis changing part configured to change a direction of the rotary axis of the working unit to a direction different from a direction of a rotary axis of the electric motor. The housing unit may include: an air inlet through which air flows from outside the housing unit into the housing unit by rotation of the fan; and an air outlet through which air fed out by the fan flows from inside the housing unit to outside the housing unit. The air outlet may communicate with a space on a working unit side.

According to the above configuration, air outputted from the air outlet flows toward the working unit to contact the ground. Due to this, the air outputted from the air outlet can be suppressed from blowing onto the user.

In one or more embodiments, the housing unit may comprise a separating wall part disposed between the electric motor and the working unit.

According to the above configuration, a space on the electric motor side and a space on a working unit side can be separated with a simple configuration of the separating wall part.

In one or more embodiments, the air outlet may be disposed on the working unit side relative to the separating wall part.

According to the above configuration, the air flowing out of the air outlet can be suppressed by the separating wall part from flowing from the space on the working unit side to the space on the electric motor side. Due to this, the air flowing out of the air outlet can be further suppressed from blowing onto the user.

In one or more embodiments, the air inlet may be disposed on an electric motor side relative to the separating wall part.

Sand and/or dust from the ground may be present/enter into the space on the working unit side. According to the above configuration, such entry of the sand and/or dust into the housing unit through the air inlet can be suppressed.

In one or more embodiments, the housing unit may comprise a body housing accommodating the electric motor and the fan. The body housing may be separate from the separating wall part.

According to the above configuration, the separating wall part can be easily replaced according to the configuration of the working unit.

In one or more embodiments, the body housing may comprise: a first body housing accommodating the electric motor; and a second body housing being separate from the first body housing and accommodating the fan.

According to the above configuration, combination of the electric motor and the fan can be easily changed.

In one or more embodiments, the air inlet may be open downward.

According to the above configuration, entry of liquid such as rain into the housing unit through the air inlet can be suppressed.

In one or more embodiments, air may flow in the housing unit from the air inlet to the air outlet when the fan rotates. The working machine may comprise a control unit disposed between the air inlet and the electric motor in a flowing direction of air and configured to control the electric motor.

According to the above configuration, cooling performance for the control unit can be enhanced.

In one or more embodiments, the fan may be a centrifugal fan.

According to the above configuration, the flow rate of the air fed out from the fan can be increased.

EMBODIMENTS

Figure 1:
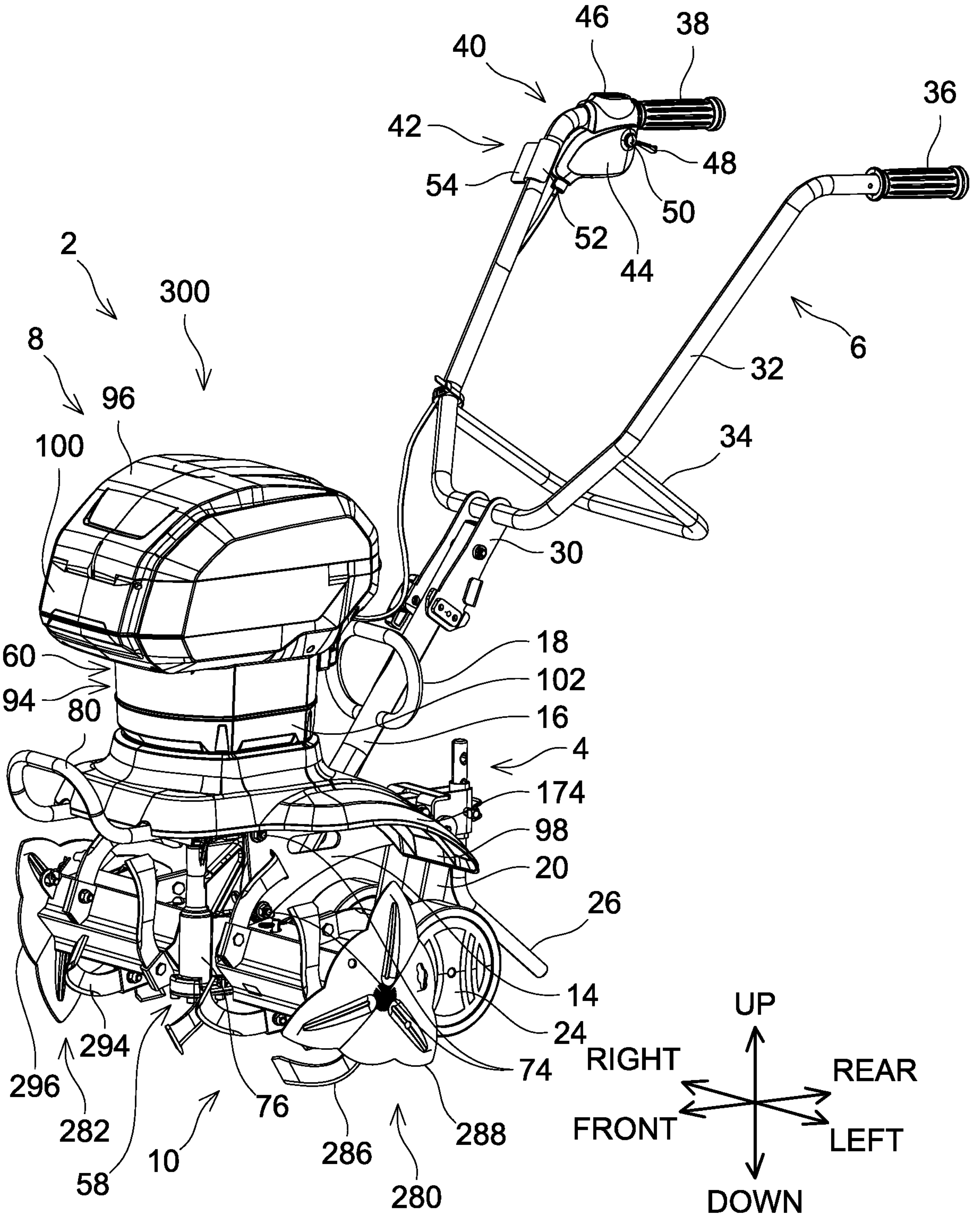
FIG. 1 illustrates a perspective view of a working machine 2 according to an embodiment.

As shown in FIG. 1, the working machine 2 is a walk-behind tiller. The working machine 2 is an electric working machine configured to operate on power from battery packs BP (see FIG. 8). The working machine 2 is configured to break up soil with working tines 286, 294 to be described later. Further, the working machine 2 is configured to remove weeds also. Furthermore, the working machine 2 is configured to make ridges by piling up the plowed soil and also break the ridges. That is, the working machine 2 is a soil cultivator. A user works by pushing the working machine 2 frontward while standing behind the working machine 2, with the working machine 2 placed on a ground P (see FIG. 2) in a working posture. Hereinafter, a moving direction of the working machine 2 will be referred to as a front-rear direction, a direction perpendicular to the front-rear direction will be referred to as a left-right direction, and a direction perpendicular to both the front-rear direction and the left-right direction will be referred to as an up-down direction. The up-down direction is perpendicular to a virtual ground P which corresponds to a plane in which heights of ups and downs of the ground P are averaged. In the present embodiment, for the sake of better viewability of drawings, the ground P and the virtual ground P are indicated by the same line. The working machine 2 comprises a frame unit 4, a handle unit 6, a body unit 8, and a working unit 10.

Figure 2:
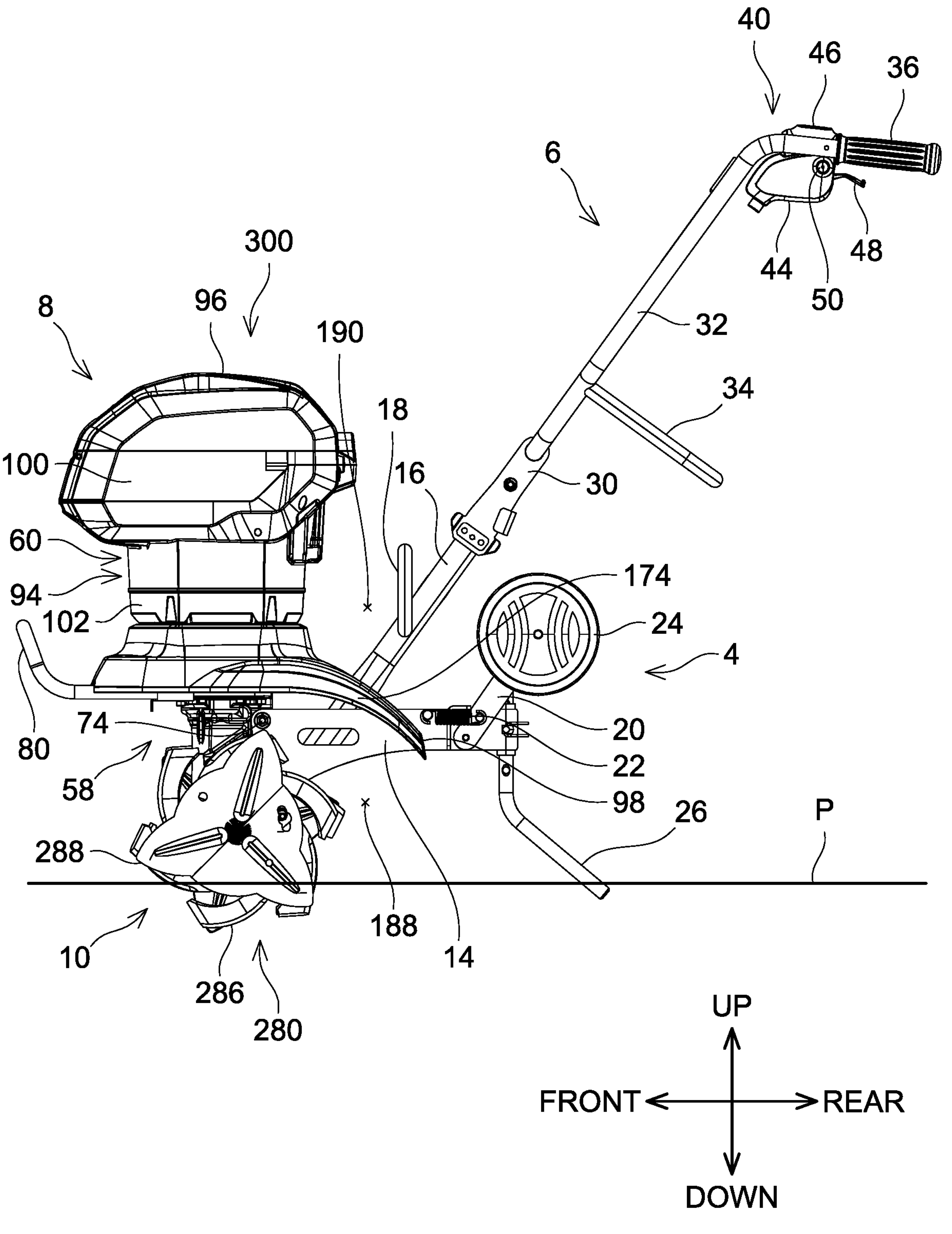
FIG. 2 illustrates a side view of the working machine 2 according to the embodiment.

As shown in FIG. 2, the frame unit 4 comprises a pair of base plates 14, a frame pipe 16, a loop handle 18, a pair of arm plates 20, bias springs 22, a pair of wheels 24, and a resistive rod 26. The pair of base plates 14 is constituted of metal. The pair of base plates 14 is fixed to each other. The frame pipe 16 is constituted of metal. The frame pipe 16 is fixed to the pair of base plates 14. The frame pipe 16 extends in upward toward the rear side. The loop handle 18 is constituted of metal. The loop handle 18 is attached to the frame pipe 16. The pair of arm plates 20 is constituted of metal. The pair of arm plates 20 is fixed to each other. The pair of arm plates 20 is pivotably attached in proximity to rear ends of the pair of base plates 14. The pair of arm plates 20 is configured to pivot between a lower position (see FIG. 1) and an upper position (see FIG. 2). Each of the bias springs 22 is attached to corresponding ones of the base plates 14 and the arm plates 20. The bias springs 22 fix the arm plates 20 either at the lower position or the upper position by biasing the arm plates 20. The pair of wheels 24 is rotatably attached to the pair of arm plates 20. One of the wheels 24 is arranged on a left side of the pair of arm plates 20 while the other of the wheels 24 is arranged on a right side of the pair of arm plates 20. A rotary shaft of the one of the wheels 24 is separate from a rotary shaft of the other of the wheels 24. Due to this, even while the pair of arm plates 20 is pivoting between the lower position and the upper position, the rotary shafts of the pair of wheels 24 do not interfere with the resistive rod 26. The pair of wheels 24 is in contact with the ground P (see FIG. 2) when the pair of arm plates 20 is in the lower position shown in FIG. 1. The user is able to easily move the working machine 2 by the wheels 24 spinning on the ground P. Contrary to this, the pair of wheels 24 is separated from the ground P when the pair of arm plates 20 is in the upper position shown in FIG. 2. The resistive rod 26 is constituted of metal. The resistive rod 26 has a curved shape that is curved near a center of its longitudinal direction. The resistive rod 26 is removably attached to the rear ends of the pair of base plates 14. The resistive rod 26 can be attached to the rear ends of the pair of base plates 14 from upward, and also can be attached to the rear ends of the pair of base plates 14 from downward. Due to this, an orientation of the resistive rod 26 can be adjusted. A position in the up-down direction of the resistive rod 26 is adjusted so that the resistive rod 26 bites into the ground P when the pair of arm plates 20 is in the upper position and the pair of wheels 24 is separated from the ground P. Because the resistive rod 26 bites into the ground P, the working machine 2 is given moving resistance, as a result of which plowing performance of the working machine 2 may be improved.

Figure 3:
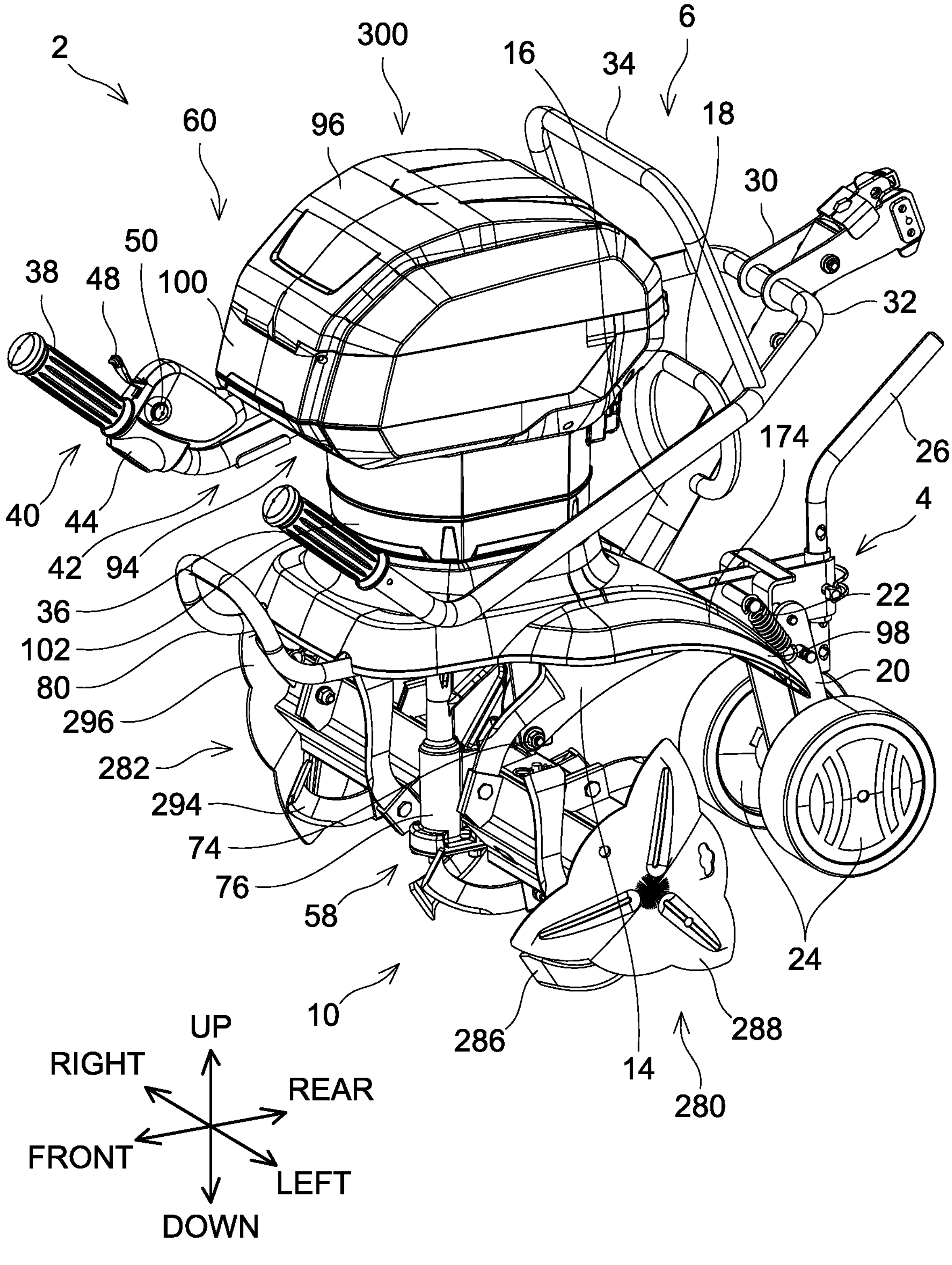
FIG. 3 illustrates a perspective view of the working machine 2 according to the embodiment, with a handle unit 6 in a folded position.

As shown in FIG. 1, the handle unit 6 is pivotably attached to the frame pipe 16. The handle unit 6 is configured to pivot between a working position (see FIG. 1) and a folded position (see FIG. 3). The handle unit 6 extends upward toward the rear side from the frame pipe 16 when it is in the working position. The user breaks the soil by grasping the handle unit 6 in the working position and moving the working machine 2. As shown in FIG. 3, the handle unit 6 is arranged so as to sandwich the body unit 8 in the left-right direction when it is in the folded position. The user switches the handle unit 6 from the working position to the folded position when the working machine 2 is to be put away in a storage or to be carried in a car. The user can easily lift the working machine 2 by holding the loop handle 18 and a front handle 80 to be described later, in this state.

As shown in FIG. 1, the handle unit 6 comprises a pair of pivot plates 30, a handle pipe 32, a reinforcing pipe 34, a left grip 36, a right grip 38, a switch box unit 40, and a switch box guard 42. The pair of pivot plates 30 is constituted of metal. The pivot plates 30 are fixed to each other. The pair of pivot plates 30 is pivotably mounted at a rear end of the frame pipe 16. The handle pipe 32 is constituted of metal. The handle pipe 32 is fixed to the pair of pivot plates 30. The handle pipe 32 has a shape of a substantially U letter. The handle pipe 32 has a shape extending leftward from the frame pipe 16, further upward toward the rear side, and finally rearward, while extending rightward from the frame pipe 16, further upward toward the rear side, and finally rearward. The reinforcing pipe 34 is constituted of metal. The reinforcing pipe 34 is coupled to a left part of the handle pipe 32 located to the left of the frame pipe 16 and to a right part of the handle pipe 32 located to the right of the frame pipe 16. The left grip 36 and the right grip 38 are both constituted of resin material. The left grip 36 is attached to the rear end of the handle pipe 32 on the left. The right grip 38 is attached to a right side of the rear end of the handle pipe 32 on the right. The user can move the working machine 2 by pushing the handle unit 6 frontward with the left grip 36 and the right grip 38 gripped with his/her hands while standing behind the working machine 2.

The switch box unit 40 comprises a switch box 44, a main power switch 46, a switch lever 48, and a lock off button 50. The switch box 44 is attached to the handle pipe 32 at a position in front of the right grip 38. The switch box 44 is constituted of a resin material. The main power switch 46 is arranged on an upper surface of the switch box 44. The main power switch 46 is configured to switch between an ON state where the working unit 10 can operate and an OFF state where the working unit 10 cannot operate. The switch lever 48 and the lock off button 50 are constituted of a resin material. The switch lever 48 is mounted pivotably on a rear end of the switch box 44. The lock off button 50 is mounted on a left wall of the switch box 44 so as to be pushed thereinto. When the switch lever 48 is pulled upward with the lock off button 50 pushed in, the working unit 10 is driven.

Figure 4:
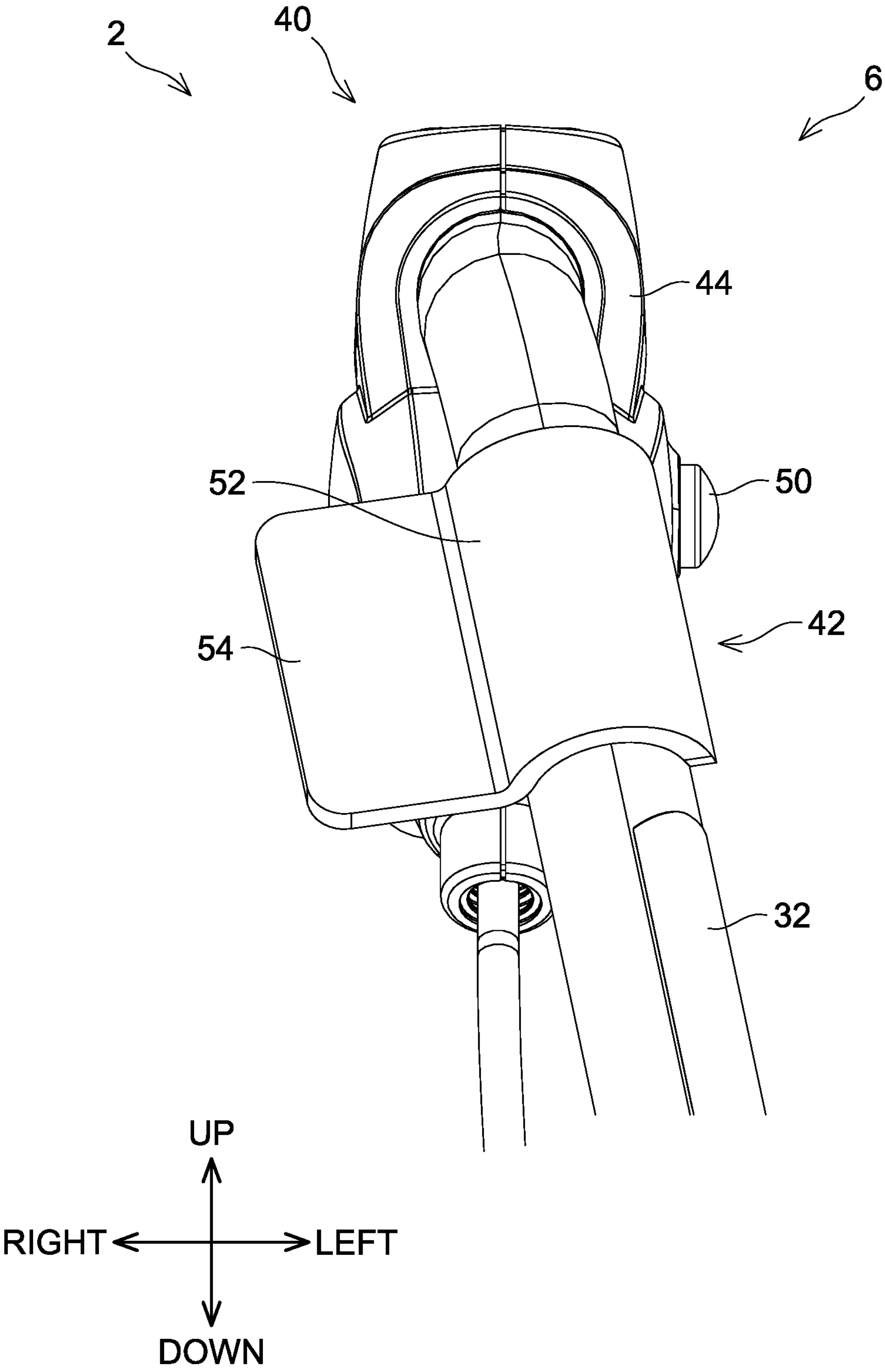
FIG. 4 illustrates a front view of the working machine 2 according to the embodiment, seeing a right grip 38 and a vicinity thereof.

The switch box guard 42 is constituted of metal. The switch box guard 42 comprises an attaching part 52 and a projecting part 54. The attaching part 52 is fixed to the handle pipe 32 at a position in front of the switch box unit 40. As shown in FIG. 4, the projecting part 54 projects rightward from the attaching part 52. The projecting part 54 projects rightward at a greater degree than a right end of the switch box unit 40. Due to this, when the working machine 2 is caused to fall rightward, the projecting part 54 contacts the ground P earlier than the switch box unit 40 such that it absorbs shock from the ground P. Due to this, the switch box unit 40 can be suppressed from being damaged or broken.

As shown in FIG. 2, the body unit 8 is attached to the frame unit 4. The body unit 8 comprises a transmission casing unit 58, a housing unit 60, and a battery attaching unit 62 (see FIG. 8). The transmission casing unit 58 is constituted of metal. The transmission casing unit 58 is fixed to front ends of the pair of base plates 14 with a bolt 74.

Figure 5:
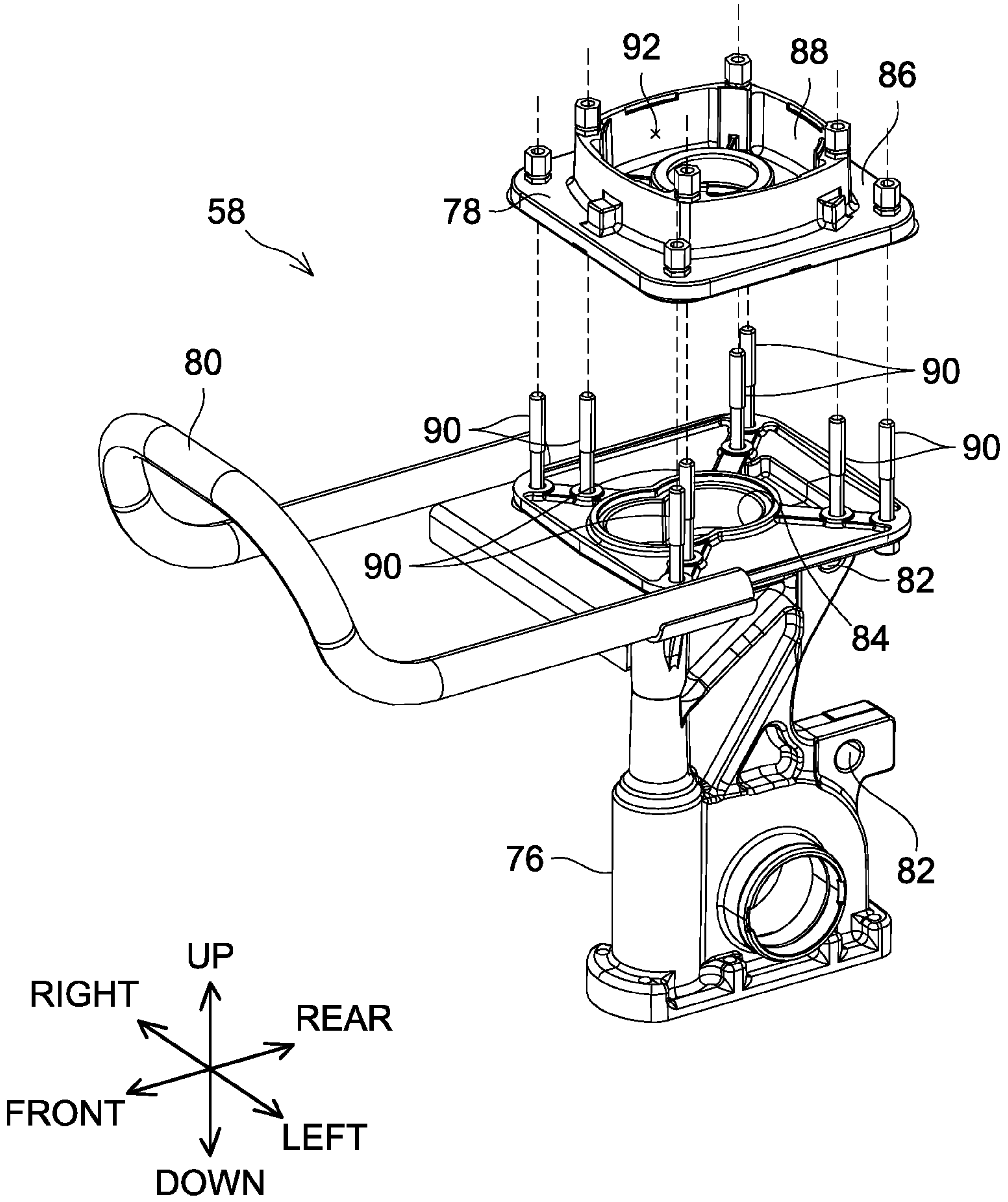
FIG. 5 illustrates a perspective, exploded view of a transmission casing unit 58 according to the embodiment.

As shown in FIG. 5, the transmission casing unit 58 comprises a first transmission casing 76, a second transmission casing 78, and a front handle 80. The first transmission casing 76 extends in the up-down direction. The working unit 10 (see FIG. 1) is arranged at a lower end of the first transmission casing 76. The first transmission casing 76 has a bolt hole 82 having the bolt 74 inserted therethrough and a gear accommodating recess 84 recessed downward from an upper surface of the first transmission casing 76.

The second transmission casing 78 comprises a plate part 86 and a cylindrical part 88. The plate part 86 is fixed to the upper surface of the first transmission casing 76 with bolts 90. The cylindrical part 88 projects upward from the plate part 86. The cylindrical part 88 has a shape of circular tube. The cylindrical part 88 has a coupling accommodating space 92 defined by an inner peripheral surface of the cylindrical part 88.

A front handle 80 is fixed near a front end of the first transmission casing 76. The front handle 80 projects frontward from the first transmission casing 76. As shown in FIG. 2, the front handle 80 projects frontward at a greater degree than the housing unit 60.

The housing unit 60 is attached to an upper part of the transmission casing unit 58. The housing unit 60 is constituted of a resin material. As shown in FIG. 6, the housing unit 60 comprises a body housing 94, a cover 96, and a fender 98. The body housing 94 is separate from each of the cover 96 and the fender 98.

The body housing 94 comprises an upper body housing 100 and a lower body housing 102. The upper body housing 100 is separate from the lower body housing 102. As shown in FIG. 6 and FIG. 7, the upper body housing 100 comprises a first neck part 104, a head part 106, and a rear coupling part 108. The head part 106 is arranged above the first neck part 104. The rear coupling part 108 is coupled to both a rear upper portion of the first neck part 104 and a rear lower portion of the head part 106. The rear coupling part 108 has a substantially rectangular shape.

The upper body housing 100 has an intake port 110 penetrating a bottom wall 108*a* of the rear coupling part 108 in the up-down direction. The intake port 110 communicates an inside and outside of the upper body housing 100. The intake port 110 comprises a plurality of air inlets 112. Each of the air inlets 112 has a cross sectional shape being substantially rectangular extending in the front-rear direction. The plurality of air inlets 112 is open downward toward the ground P (see FIG. 2). The plurality of air inlets 112 is aligned in the left-right direction.

As shown in FIG. 8, the cover 96 is attached pivotably to an upper end of the upper body housing 100. A pivot axis RX of the cover 96 is located at a front end of the upper body housing 100. The cover 96 pivots between a closed position and an open position. As shown in FIG. 9, when the cover 96 is located in the closed position, a battery accommodating space 114 is defined between the cover 96 and an upper surface of the head part 106. As shown in FIG. 8, when the user pivots the cover 96 from the closed position (see FIG. 9) to the open position while standing behind the working machine 2, the cover 96 opens from rear to front. When the user takes his/her hand(s) off the cover 96 with the working machine 2 placed on the ground P in the working posture and the cover 96 being in the open position, the cover 96 pivots from the open position to the closed position due to self-weight of the cover 96.

As shown in FIG. 9, the battery attaching unit 62 is attached to the upper surface of the head part 106. An upper surface 62*a* of the battery attaching unit 62 is inclined relative to a plane extending along the left-right direction and the front-rear direction (that is, the virtual ground P). The upper surface 62*a* extends from a rear upper side toward a front lower side. A position of the upper surface 62*a* in the up-down direction descends as it approaches from a rear end toward a front end of the upper surface 62*a*.

As shown in FIG. 8, the battery attaching unit 62 has two battery packs BP removably attached thereto. In FIG. 8, for easier understanding of the position of the battery attaching unit 62, one battery pack BP is omitted. The battery pack BP is attached to the battery attaching unit 62 when the battery pack BP is slid on the upper surface 62*a* of the battery attaching unit 62 in an attaching direction D1 directed to the front lower side with the cover 96 being in the open position, whereas on the other hand the battery pack BP is removed from the battery attaching unit 62 when the battery pack BP is slid on the upper surface 62*a* in a removing direction D2 directed to the rear upper side. The upper surface 62*a* of the battery attaching unit 62 corresponds to a slide surface on which the battery packs BP is slid. The attaching direction D1 is directed to the ground P while the removing direction D2 is not directed to the ground P. The two battery packs BP are aligned in the left-right direction when they are attached to the battery attaching unit 62.

Each of the battery packs BP comprises a battery level indicator 115. The battery level indicator 115 is configured to indicate a remaining level of charge in the battery pack BP. When the battery pack BP is attached to the battery attaching unit 62, the battery level indicator 115 faces upward toward the rear side. Due to this, when the battery pack BP is attached to the battery attaching unit 62 and also the cover 96 is in the open position, the user can easily see the battery level indicator 115.

In the present embodiment, when the two battery packs BP are attached to the battery attaching unit 62, firstly, charge in one of the battery packs BP (e.g., the left battery pack BP) is consumed. Once the level of charge in the one battery packs BP turns zero, charge in the other battery pack BP (e.g., the right battery pack BP) is in turn consumed. Due to this, even while the charge in the other battery pack BP is being consumed, the one battery pack BP of which charge is zero can be removed from the battery attaching unit 62 and then a new battery pack BP can be attached to the battery attaching unit 62. Further, two indicator lamps 116 are arranged near a rear end of the upper surface of the head part 106. The left indicator lamp 116 turns on or blinks when a level of charge in the left battery pack BP lower to a certain value or less, whereas on the other hand, the right indicator lamp 116 turns on or blinks when a level of charge in the right battery pack BP lowers to a certain value or less.

As shown in FIG. 6, the lower body housing 102 is disposed below the upper body housing 100. As shown in FIG. 10, the lower body housing 102 defines an accommodating space 120 between the upper body housing 100 and the lower body housing 102. The body unit 8 further comprises a partitioning member 122 dividing the accommodating space 120 into an upper accommodating space 124 and a lower accommodating space 126. The upper accommodating space 124 is defined by the upper body housing 100 and the partitioning member 122. The lower accommodating space 126 is defined by the lower body housing 102 and the partitioning member 122.

The partitioning member 122 is constituted of metal. The partitioning member 122 comprises an upper partitioning member 128 and a lower partitioning member 129. The upper partitioning member 128 comprises a flange part 130, a cylindrical part 132, and a bottom wall part 134. The flange part 130 is fixed to the upper body housing 100. The cylindrical part 132 is disposed below the flange part 130. The cylindrical part 132 has a circular tube shape. The bottom wall part 134 is disposed at a lower end of the cylindrical part 132. The bottom wall part 134 has a plate shape. The bottom wall part 134 has a throughhole 136 extending through the bottom wall part 134 in a thickness direction (up-down direction).

The lower partitioning member 129 is disposed below the upper partitioning member 128. The lower partitioning member 129 is fixed to the upper partitioning member 128. The lower partitioning member 129 has a substantially plate shape. The lower partitioning member 129 has a throughhole 138 extending through the lower partitioning member 129 in the thickness direction (up-down direction). The throughhole 138 overlaps the throughhole 136 of the bottom wall part 134 along the up-down direction.

As shown in FIG. 6 and FIG. 7, the lower body housing 102 comprises a second neck part 140, a cylindrical part 142, and a bottom wall part 144. The second neck part 140 is attached to a lower end of the first neck part 104. The cylindrical part 142 is disposed below the second neck part 140. The cylindrical part 142 has a substantially circular tube shape. The bottom wall part 144 is disposed at a lower end of the cylindrical part 142. The bottom wall part 144 has a plate shape. The bottom wall part 144 has a throughhole 145 extending through the bottom wall part 144 along the thickness direction (up-down direction).

The cylindrical part 142 has a front communicating port 146 and a rear communicating port 147 which extend through the cylindrical part 142 in the thickness direction. A position of the front communicating port 146 in the up-down direction is substantially the same as a position of the rear communicating port 147 in the up-down direction. Each of the front communicating port 146 and the rear communicating port 147 communicates the lower accommodating space 126 (see FIG. 10) with outside of the lower body housing 102. The front communicating port 146 and the rear communicating port 147 are apart from each other in a circumferential direction on an outer peripheral surface of the cylindrical part 142. The front communicating port 146 is disposed on a front part of the cylindrical part 142, while the rear communicating port 147 is disposed on a rear part of the cylindrical part 142. Each of the front communicating port 146 and the rear communicating port 147 comprises a plurality of communicating openings 148. Each of the communicating openings 148 has a cross-sectional shape of substantially rectangular extending in the up-down direction. Each of the communicating openings 148 is open outward in a radial direction of the cylindrical part 142 and in a direction perpendicular to the up-down direction. In each of the front communicating port 146 and the rear communicating port 147, the plurality of communicating openings 148 are aligned in the circumferential direction of the outer peripheral surface of the cylindrical part 142. Each of a total opening area of the plurality of communicating openings 148 in the front communicating port 146 and a total opening area of the plurality of communicating openings 148 in the rear communicating port 147 is greater than a total opening area of the plurality of air inlets 112.

As shown in FIG. 11, the lower body housing 102 further comprises a peripheral rib 150, an annular rib 152, and a plurality of (16 in the present embodiment) radial ribs 154. The peripheral rib 150, the annular rib 152, and the plurality of radial ribs 154 are coupled to an upper surface **144*a* of the bottom wall part 144. As shown in FIG. 12, the plurality of radial ribs 154 is coupled to an inner peripheral surface 142*a* of the cylindrical part 142, the peripheral rib 150, and the annular rib 152. The peripheral rib 150, the annular rib 152, and the plurality of radial ribs 154 project upward from the upper surface 144*a* of the bottom wall part 144. An upper end of the peripheral rib 150, an upper end of the annular rib 152, and upper ends of the plurality of radial ribs 154 are placed lower than (on a bottom wall part 144 side) each of a lower end of the rear communicating port 147 and a lower end of the front communicating port 146 (see FIG. 6**).

As shown in FIG. 11, the peripheral rib 150 surrounds an entirety of a periphery of the throughhole 145. The peripheral rib 150 is apart from the inner peripheral surface **142*a* of the cylindrical part 142**.

The annular rib 152 has a annular ring shape. The annular rib 152 is disposed between the inner peripheral surface **142*a* of the cylindrical part 142 and the peripheral rib 150. The annular rib 152 is apart from the inner peripheral surface 142*a* of the cylindrical part 142 and the peripheral rib 150**.

The plurality of radial ribs 154 extends from the inner peripheral surface **142*a* of the cylindrical part 142 to the peripheral rib 150. The plurality of radial ribs 154 extends inward in the radial direction of the cylindrical part 142 from the inner peripheral surface 142*a* of the cylindrical part 142. The plurality of radial ribs 154 is aligned at equal intervals in the circumferential direction of the inner peripheral surface 142*a* of the cylindrical part 142. The plurality of radial ribs 154 divides a space between the inner peripheral surface 142*a* of the cylindrical part 142 and the annular rib 152 into a plurality of first spaces 156. Further, the plurality of radial ribs 154 divides a space between the annular rib 152 and the peripheral rib 150 into a plurality of second spaces 158**.

As shown in FIG. 12, each of the eight radial ribs 154 has a first space communicating hole 160 and a second space communicating hole 162. In the present embodiment, in the circumferential direction of the inner peripheral surface 142*a* of the cylindrical part 142, the radial ribs 154 each having the first space communicating hole 160 and the second space communicating hole 162 and the radial ribs 154 having no first space communicating hole 160 and no second space communicating hole 162 are alternately arranged. Each first space communicating hole 160 and each second space communicating hole 162 extend through the corresponding radial rib 154 in its thickness direction. Each first space communicating hole 160 and each second space communicating hole 162 are arranged at a lower end of the corresponding radial rib 154. The first space communicating holes 160 are disposed between the inner peripheral surface 142*a* of the cylindrical part 142 and the annular rib 152. Each first space communicating hole 160 communicates adjacent first spaces 156 with each other. The second space communicating holes 162 are disposed between the annular rib 152 and the peripheral rib 150. Each second space communicating hole 162 communicates adjacent second spaces 158 with each other.

As shown in FIG. 11, the bottom wall part 144 further comprises a plurality of (8 in the present embodiment) first drainage holes 164 and a plurality of (8 in the present embodiment) second drainage holes 166. The first drainage holes 164 and the second drainage holes 166 extend through the bottom wall part 144 in its thickness direction (up-down direction). As shown in FIG. 12, each of the first drainage holes 164 is connected with a lower end of a corresponding one of the first space communicating holes 160. The first drainage holes 164 communicate the first spaces 156 with the outside of the lower body housing 102 via the first space communicating holes 160. Due to this, even when liquid passes through a minute gap at a connection between the upper body housing 100 (see FIG. 7) and the lower body housing 102, the front communicating port 146 and/or the rear communicating port 147 and enters the first space(s) 156 for example, the liquid passes through the first space communicating hole(s) 160 and the first drainage hole(s) 164 to be discharged outside the lower body housing 102. Each of the second drainage holes 166 is connected with a lower end of a corresponding one of the second space communicating holes 162. The second drainage holes 166 communicate the second spaces 158 with the outside of the lower body housing 102 via the second space communicating holes 162. Due to this, even when liquid passes through a minute gap at a connection between the upper body housing 100 and the lower body housing 102, the front communicating port 146 and/or the rear communicating port 147 and enters the second space(s) 158 for example, the liquid passes through the second space communicating hole(s) 162 and the second drainage hole(s) 166 to be discharged outside the lower body housing 102.

As shown in FIG. 6, the fender 98 is disposed below the lower body housing 102. The fender 98 is fixed to the transmission casing unit 58 (see FIG. 5) and the lower body housing 102 with the bolts 90 (see FIG. 5). The fender 98 comprises a surrounding wall part 170, a bottom wall part 172, and a separating wall part 174.

The surrounding wall part 170 has a square tubular shape. As shown in FIG. 10, the surrounding wall part 170 surrounds a lower end of the second neck part 140 at a minute gap from the lower end of the second neck part 140. Further, the surrounding wall part 170 surrounds the cylindrical part 142. The surrounding wall part 170 is separate from the cylindrical part 142.

The bottom wall part 172 is disposed at a lower end of the surrounding wall part 170. The bottom wall part 172 is disposed lower than the lower body housing 102. The bottom wall part 172 has a plate shape. The bottom wall part 172 faces the bottom wall part 144 of the lower body housing 102. The bottom wall part 172 and the bottom wall part 144 are separate from each other in the up-down direction. Due to these configurations, an air exhaust space 176 is defined between the surrounding wall part 170 and the bottom wall part 172 of the fender 98 and the cylindrical part 142 and the bottom wall part 144 of the lower body housing 102. The air exhaust space 176 communicates with the lower accommodating space 126 via the front communicating port 146 and the rear communicating port 147.

The lower body housing 102 comprises positioning projections 178 projecting downward from the bottom wall part 144, and the bottom wall part 172 comprises positioning holes 180 that receive the positioning projections 178. By the positioning holes 180 receiving the positioning projections 178, the fender 98 is positioned in place relative to the lower body housing 102. The bottom wall part 172 further comprises two third drainage holes 182 extending through the bottom wall part 172 in its thickness direction (up-down direction). The third drainage holes 182 communicate a space inside the surrounding wall part 170 (the air exhaust space 176) and a space outside the surrounding wall part 170 with each other. Due to this, even when liquid passes through a minute gap at a connection between the surrounding wall part 170 and the lower end of the second neck part 140, the first drainage hole(s) 164 (see FIG. 12) and/or the second drainage hole(s) 166 (see FIG. 12) and enters the air exhaust space 176 for example, the liquid passes through the third drainage hole(s) 182 to be discharged outside the surrounding wall part 170.

The bottom wall part 172 comprises an air outlet 184 extending through the bottom wall part 172 in its thickness direction (up-down direction). The air outlet 184 is open downward toward the ground P (see FIG. 2). The air outlet 184 overlaps the throughhole 145 of the lower body housing 102 along the up-down direction. Further, as shown in FIG. 13, the air outlet 184 has the cylindrical part 88 of the second transmission casing 78 inserted therethrough. In the air outlet 184, the bottom wall part 172 is apart from an outer peripheral surface of the cylindrical part 88. An opening area between the bottom wall part 172 and the cylindrical part 88 is larger than a sum of a total opening area of the plurality of communicating openings 148 (see FIG. 6) in the front communicating port 146 and a total opening area of the plurality of communicating openings 148 (see FIG. 7) in the rear communicating port 147. Further, the opening area between the bottom wall part 172 and the cylindrical part 88 is larger than a total opening area of the third drainage holes 182.

As shown in FIG. 10, the separating wall part 174 is coupled to an upper end of the surrounding wall part 170. The separating wall part 174 surrounds an outer peripheral surface of the surrounding wall part 170. The separating wall part 174 extends from the surrounding wall part 170 in a direction separating away from the surrounding wall part 170. As shown in FIG. 2 and FIG. 14, the separating wall part 174 has a shape that a rear part of the separating wall part 174 is longer than a front part of the separating wall part 174. The separating wall part 174 extends from the surrounding wall part 170 and approaches toward the ground P.

The separating wall part 174 is disposed to be interposed between the working unit 10 and the user standing behind the working machine 2 (e.g., an upper body of the user). Due to this, even when sand and/or stone flies toward the user due to the operation of the working unit 10, the sand and/or stone can be suppressed from hitting the user. Further, the separating wall part 174 is disposed so as to partially cover the working unit 10. The separating wall part 174 is disposed between the working unit 10 and the upper body housing 100. The separating wall part 174 separates a lower space 188 on a working unit 10 side and an upper space 190 on an upper body housing 100 side.

As shown in FIG. 10, the intake port 110 is disposed on the upper body housing 100 side relative to the separating wall part 174. Due to this, the intake port 110 communicates with the upper space 190. The air outlet 184 is disposed on the working unit 10 side relative to the separating wall part 174. Due to this, the air outlet 184 communicates with the lower space 188.

As shown in FIGS. 9, 10, and 14, the body unit 8 comprises a sponge member 194, a control unit 196, an upper motor casing 198, an electric motor 200, a transmitting unit 202, and a fan 204. The sponge member 194, the control unit 196, the upper motor casing 198, and the electric motor 200 are arranged in the upper accommodating space 124.

As shown in FIG. 9, the sponge member 194 is disposed inside the rear coupling part 108. The sponge member 194 is disposed directly above the intake port 110. The sponge member 194 is a foam body with a plurality of micropores.

The control unit 196 is disposed by traversing over the inside of the rear coupling part 108 and the inside of the head part 106. The control unit 196 is disposed substantially parallel to the up-down direction and the left-right direction. The control unit 196 is separate from a rear inner surface of the rear coupling part 108 and an upper inner surface of the head part 106. The control unit 196 comprises an inverter circuit comprising a plurality of switching elements and a control circuit configured to control respective operations of the switching elements. The control unit 196 controls the electric motor 200.

The upper motor casing 198 is constituted of metal. As shown in FIGS. 9 and 10, the upper motor casing 198 is disposed inside the first neck part 104. The upper motor casing 198 is disposed above the upper partitioning member 128. The upper motor casing 198 is fixed to the upper partitioning member 128 with not-shown bolts. The upper motor casing 198 defines a motor accommodating space 206 between the upper motor casing 198 and the upper partitioning member 128. The electric motor 200 is disposed in the motor accommodating space 206. The upper motor casing 198 and the upper partitioning member 128 constitute a motor casing 208, and the upper partitioning member 128 corresponds to a lower motor casing.

The upper motor casing 198 has motor air inlets 210 communicating the motor accommodating space 206 and outside of the motor casing 208. Further, as shown in FIG. 15, the upper partitioning member 128 has motor air outlets 212 extending through the bottom wall part 134. The motor air outlets 212 are disposed near the cylindrical part 132.

As shown in FIGS. 9 and 10, the electric motor 200 is an outer rotor brushless motor. The electric motor 200 is disposed in the upper space 190. The electric motor 200 is driven by power supplied from the battery packs BP (see FIG. 8). The electric motor 200 comprises a stator 214 and a rotor 216. The stator 214 comprises a stator core 218 and a plurality of coils 220 wound on the stator core 218. The rotor 216 comprises a cylindrical rotor body 224 having a lower end comprising a bottom wall 222 and a plurality of permanent magnets 226 fixed to the rotor body 224. The rotor 216 rotates about a rotary axis AX1 by the charge in the battery packs BP (see FIG. 8) being supplied to the plurality of coils 220. The rotary axis AX1 extends in the up-down direction and is substantially perpendicular to the virtual ground P (see FIG. 14).

As shown in FIGS. 10 and 14, the transmitting unit 202 comprises a first transmitting shaft 230, a jaw coupler 232, a first helical gear 236, a second helical gear 238, a second transmitting shaft 240, a worm gear 242, a worm wheel 244, and output shafts 246, 248.

The first transmitting shaft 230 is constituted of metal. As shown in FIG. 10, the first transmitting shaft 230 fits into the bottom wall 222 of the rotor body 224 by being inserted therethrough. The first transmitting shaft 230 is rotatably supported by the motor casing 208 via a bearing 249 and a bearing 250. The first transmitting shaft 230 rotates about the rotary axis AX1 with the rotor 216. The first transmitting shaft 230 extends through the throughhole 136 of the upper partitioning member 128 and the throughhole 138 of the lower partitioning member 129.

The jaw coupler 232 is arranged by traversing over the gear accommodating recess 84, the coupling accommodating space 92, and the lower accommodating space 126. The jaw coupler 232 extends through the throughhole 145 of the lower body housing 102 and the air outlet 184 of the fender 98. The jaw coupler 232 comprises a first member 252, a coupler member 254, and a second member 256. The first member 252 is constituted of metal. The first member 252 fits with a lower end of the first transmitting shaft 230. The lower end of the first transmitting shaft 230 is inserted into the first member 252. Due to this, the jaw coupler 232 rotates about the rotary axis AX1 with the first transmitting shaft 230.

The first member 252 extends through the fan 204. The fan 204 is constituted of a resin material. The fan 204 fits with the first member 252. The fan 204 is, for example, a centrifugal fan. A position in the up-down direction of the fan 204 is substantially the same as a position in the up-down direction of the front communicating port 146 and a position in the up-down direction of the rear communicating port 147. The fan 204 faces each of the front communicating port 146 and the rear communicating port 147 in a radial direction of the fan 204. The fan 204 rotates about the rotary axis AX1 with the jaw coupler 232. The fan 204 feeds air toward the front communicating port 146 and the rear communicating port 147 respectively.

As shown in FIG. 16, the first member 252 comprises three first claws 258 disposed at its lower end. The three first claws 258 are arranged at equal intervals about the rotary axis AX1. An interval between adjacent first claws 258 is 120 degrees in a circumferential direction of the rotary axis AX1.

The coupler member 254 couples the first member 252 and the second member 256. The coupler member 254 is constituted of a resin material. The coupler member 254 has a disc shape. The coupler member 254 has six claw receiving holes 260 extending through the coupler member 254 in its thickness direction (up-down direction). The six claw receiving holes 260 are arranged at equal intervals about the rotary axis AX1. An interval between the claw receiving holes 260 is 60 degrees in the circumferential direction of the rotary axis AX1. When the coupler member 254 is coupled with the first member 252, three of the claw receiving holes 260 receive the three first claws 258.

The second member 256 is constituted of metal. The second member 256 comprises three second claws 262 positioned at its upper end. The three second claws 262 are arranged at equal intervals about the rotary axis AX1. An interval between adjacent second claws 262 is 120 degrees in the circumferential direction of the rotary axis AX1. When the coupler member 254 is coupled to the second member 256, the three second claws 262 are received in the remaining three claw receiving holes 260 which do not have the first claws 258 received therein.

As shown in FIG. 14, the second member 256 is rotatably supported by the second transmission casing 78 via a bearing 264. An upper end and a vicinity thereof of the second member 256 and the coupler member 254 are disposed by traversing over the gear accommodating recess 84 and the coupling accommodating space 92.

The first helical gear 236 and the second helical gear 238 are constituted of metal. The first helical gear 236 and the second helical gear 238 are arranged in the gear accommodating recess 84. The first helical gear 236 fits with the second member 256. The second helical gear 238 is disposed on the front side relative to the first helical gear 236. The second helical gear 238 meshes with the first helical gear 236.

The first transmission casing 76 has a shaft hole 266 extending in the up-down direction, and the second transmitting shaft 240 extends through the shaft hole 266. The second transmitting shaft 240 is constituted of metal. The second transmitting shaft 240 extends in the up-down direction. An upper end of the second transmitting shaft 240 fits with the second helical gear 238. The second transmitting shaft 240 is rotatably supported by the first transmission casing 76 via bearings 268, 270, 272. The second transmitting shaft 240 rotates with the jaw coupler 232 with the first helical gear 236 and the second helical gear 238 meshing with each other. A rotary axis AX2 of the second transmitting shaft 240 is offset frontward from the rotary axis AX1 of the jaw coupler 232. The rotary axis AX2 extends in the up-down direction and substantially is perpendicular to the virtual ground P.

The worm gear 242 and the worm wheel 244 are constituted of metal. The worm gear 242 fits with a lower end and vicinity thereof of the second transmitting shaft 240. The first transmission casing 76 has a wheel accommodating space 276 of a substantially disc shape, and the worm wheel 244 is disposed in the wheel accommodating space 276. The worm wheel 244 has a substantially disc shape. The worm wheel 244 meshes with the worm gear 242. The worm wheel 244 rotates about a rotary axis AX3 when the worm gear 242 rotates about the rotary axis AX2. The rotary axis AX3 is substantially parallel to the virtual ground P, and extends in the left-right direction along the virtual ground P. A direction in which the rotary axis AX3 extends differs from directions in which the rotary axes AX1, AX2 extend.

As shown in FIG. 17, the output shafts 246, 248 fit with the worm wheel 244. The output shafts 246, 248 are constituted of metal. The output shaft 246 extends leftward from the worm wheel 244 while the output shaft 248 extends rightward from the worm wheel 244. The output shafts 246, 248 are each rotatably supported by the first transmission casing 76 (see FIG. 14) via not-shown bearings. The output shafts 246, 248 rotate about the rotary axis AX3 with the worm wheel 244. The output shafts 246, 248 cause the working unit 10 to rotate.

As shown in FIG. 18, the working unit 10 comprises a left working unit 280 and a right working unit 282. The left working unit 280 and the right working unit 282 are constituted of metal. The left working unit 280 comprises a left claw attaching box 284, a plurality of left working claws 286, and a left plate 288. The left claw attaching box 284 is fixed to the output shaft 246. Due to this, the left working unit 280 rotates about the rotary axis AX3 with the output shaft 246. The left claw attaching box 284 extends leftward from the output shaft 246. The left claw attaching box 284 extends leftward longer than a left end of the fender 98. An outer contour of the fender 98 is shown in a broken line in FIG. 18. The plurality of left working claws 286 is fixed to the left claw attaching box 284. The left working claws 286 are for example, tines. The plurality of left working claws 286 breaks soil on the ground P by rotating. The left plate 288 is attached to a left end of the left claw attaching box 284.

The right working unit 282 comprises a right claw attaching box 292, a plurality of right working claws 294, and a right plate 296. The right claw attaching box 292 is fixed to the output shaft 248. Due to this, the right working unit 282 rotates about the rotary axis AX3 with the output shaft 248. The right claw attaching box 292 extends rightward from the output shaft 248. The right claw attaching box 292 extends rightward longer than a right end of the fender 98. The plurality of right working claws 294 is fixed to the right claw attaching box 292. The right working claws 294 are for example tines. The plurality of right working claws 294 breaks soil on the ground P by rotating. The right plate 296 is attached to a right end of the right claw attaching box 292.

As shown in FIGS. 18 to 20, a positional relationship between the battery packs BP, the working unit 10, the battery attaching unit 62, the control unit 196, the motor casing 208 (the electric motor 200), and the fan 204 will be described. As shown in FIG. 18, when the working machine 2 is viewed from the front side with the working machine 2 being in the working posture on the ground P, the battery packs BP, the motor casing 208 (the electric motor 200), the fan 204, and the working unit 10 are separate from each other in the up-down direction. Here, when the working machine 2 is placed in the working posture on the ground P, each of the rotary axes AX1, AX2 is substantially perpendicular to the virtual ground P. The working unit 10, the fan 204, the motor casing 208 (the electric motor 200), the battery attaching unit 62, and the battery packs BP are aligned in this order in an upward direction. The left-side battery pack BP, the battery attaching unit 62, the motor casing 208 (the electric motor 200), the fan 204, and the left working unit 280 are aligned in one line in the up-down direction. Similarly, the right-side battery pack BP, the battery attaching unit 62, the motor casing 208 (the electric motor 200), the fan 204, and the right working unit 282 are aligned in one line in the up-down direction. Because a force generated by self-weight of the battery packs BP and a force generated by self-weight of the electric motor 200 act on the working unit 10, the working unit 10 may be suppressed from lifting off from the ground P. The battery packs BP and the motor casing 208 (the electric motor 200) do not overlap each other in the front-rear direction or in the left-right direction. The battery attaching unit 62 and the motor casing 208 (the electric motor 200) do not overlap each other in the front-rear direction or in the left-right direction. The motor casing 208 (the electric motor 200) and the fan 204 do not overlap each other in the front-rear direction or in the left-right direction. The fan 204 and the working unit 10 do not overlap each other in the front-rear direction or in the left-right direction.

When the working machine 2 is viewed from above with the working machine 2 being in the working posture on the ground P as shown in FIG. 19, the battery packs BP, the motor casing 208 (the electric motor 200), and the working unit 10 overlap each other. Although not shown, the fan 204 also overlaps each of the battery packs BP, the motor casing 208 (the electric motor 200), and the working unit 10.

When the working machine 2 is viewed from the left with the working machine 2 being in the working posture on the ground P as shown in FIG. 20, the control unit 196 is disposed on the rear side relative to the battery packs BP and the battery attaching unit 62. The control unit 196 overlaps each of the battery packs BP and the battery attaching unit 62 in the front-rear direction. The control unit 196 does not overlap each of the battery packs BP and the battery attaching unit 62 in the up-down direction. The control unit 196 overlaps the working unit 10 in the up-down direction. The control unit 196 is disposed on the rear side relative to the rotary axis AX3 of the working unit 10. The rotary axis AX3 of the working unit 10 is disposed on the rear side relative to the rotary axis AX1 of the electric motor 200. A center of gravity G1 of the battery packs BP is disposed on the front side relative to the rotary axes AX1, AX2, AX3.

Next, operation of the working machine 2 will be described. As shown in FIGS. 9, 10, and 14, the control unit 196 supplies the charge in the battery packs BP to the plurality of coils 220 in the electric motor 200 when the working unit 10 is switched to the ON state by the main power switch 46 (see FIG. 1) being operated, the lock-off button 50 (see FIG. 1) pushed in, and the switch lever 48 (see FIG. 1) lifted upward. Due to this, the rotor 216 rotates about the rotary axis AX1. Thereafter, the rotation of the rotor 216 is transmitted to the working unit 10 sequentially via the first transmitting shaft 230, the jaw coupler 232, the first helical gear 236, the second helical gear 238, the second transmitting shaft 240, the worm gear 242, the worm wheel 244, and the output shafts 246, 248 in this order. Due to this, the working unit 10 rotates about the rotary axis AX3. Further the direction in which the rotary axis AX3 extends (i.e., the left-right direction) is changed by the worm gear 242 and the worm wheel 244 to a direction different from the direction in which the rotary axes AX1, AX2 extend (up-down direction). The rotation of the working unit 10 causes soil on the ground P to be plowed by the left working claws 286 (see FIG. 17) and the right working claws 294.

Further, when the rotor 216 rotates, the fan 204 also rotates. Due to this, a flow of air is generated in the housing unit 60. The flow of air is shown by arrows in FIGS. 9, 10, 13 and 14. Specifically, as shown in FIG. 9, the air firstly enters the intake port 110 to flow from the space outside the body housing 94 (the upper space 190) into the upper accommodating space 124. Next, the air passes through the sponge member 194, flows upward between the control unit 196 and the rear coupling part 108, and then turns to flow frontward between the control unit 196 and an upper inner surface of the head part 106. Due to this, the control unit 196 is cooled. Here, since the air passes through the sponge member 194, foreign matter such as dust can be suppressed from entering the upper accommodating space 124. Next, the air turns to flow downward toward the motor casing 208. As shown in FIG. 10, the air subsequently enters the motor air inlets 210 and flows into the motor accommodating space 206. Next, the air passes through the electric motor 200 to pass through the motor air outlets 212 (see FIG. 15), the throughhole 138 of the lower partitioning member 129 sequentially in this order and flows into the lower accommodating space 126. As such, the electric motor 200 is cooled.

Next, the air flows downward to the fan 204 and is then fed by the fan 204 outward in the radial direction (direction perpendicular to the rotary axis AX1) of the fan 204. As shown in FIG. 13, the air enters the front communicating port 146 and the rear communicating port 147 (see FIG. 6) and then flows into the air exhaust space 176. Next, the air flows downward and then turns to flow toward the rotary axis AX1 (see FIG. 10) to the air outlet 184. Next, the air flows between the bottom wall part 172 of the fender 98 and the second transmission casing 78 to be discharged from the air outlet 184 to the space outside the body housing 94 (the lower space 188). As shown in FIG. 14, the air flows toward the working unit 10 (toward the ground P).

In the present embodiment, the battery attaching unit 62, the cover 96, the upper body housing 100, the sponge member 194, the control unit 196, the electric motor 200, the motor casing 208, the lower partitioning member 129, and the first transmitting shaft 230 may be implemented in the working machine 2 other than a cultivator/tiller. Hereafter, the above-listed nine configurations will be collectively referred to as "common unit 300". As shown in FIG. 21, the common unit 300 is implemented in a lawn mower 400, for example. The common unit 300 is mounted on a deck 402 of the lawn mower 400. The lawn mower 400 is a walk behind type or self-propelled electric working machine. A cutting blade 404 of the lawn mower 400 fits with the first transmitting shaft 230 (see FIG. 10) of the common unit 300. Due to this, the cutting blade 404 rotates about the rotary axis AX1. The cutting blade 404 is configured to cut lawn on the ground P (see FIG. 2) by rotating.

(Effects)

The working machine 2 in the present embodiment is configured to work by moving frontward on the ground P. The working machine 2 comprises: the battery packs BP (example of a battery); the electric motor 200 comprising the stator 214, and the rotor 216 and configured to be driven by electric power supplied from the battery packs BP; the working unit 10 configured to work on the ground P by being rotated about the rotary axis AX3 by the electric motor 200, the rotary axis AX3 being substantially parallel to the virtual ground P perpendicular to the up-down direction; and the transmitting unit 202 configured to transmit rotation of the electric motor 200 to the working unit 10. When the working machine 2 is viewed from the front side with the working machine 2 being in the working posture on the ground P, the battery packs BP, the electric motor 200, and the working unit 10 are separate from each other in the up-down direction and the working unit 10 is disposed below the battery packs BP and the electric motor 200.

According to the above configuration, both of force by the self-weight of the battery packs BP and a force by self-weight of the electric motor 200 act on the working unit 10. Due to this, the working unit 10 can be suppressed from lifting off from the ground P.

The transmitting unit 202 comprises: the first transmitting shaft 230 configured to be rotated by the electric motor 200; the jaw coupler 232 connected to the first transmitting shaft 230; and the second transmitting shaft 240 configured to transmit rotation of the first transmitting shaft 230 to the working unit 10 via the jaw coupler 232.

According to the above configuration, combination of the electric motor 200 and the working unit 10 can be easily changed by using the jaw coupler 232.

The jaw coupler 232 comprises the coupling member constituted of a resin material.

According to the above configuration, vibration of the first transmitting shaft 230 and vibration of the second transmitting shaft 240 can be reduced by the coupling member.

The working machine 2 further comprises: the body housing 94 accommodating the electric motor 200; and the battery attaching unit 62 attached to the body housing 94 and to which the battery packs BP are detachably attached. The attaching direction D1 in which the battery packs BP are attached to the battery attaching unit 62 is inclined relative to the virtual ground P and is oriented toward the ground P.

According to the above configuration, the user can easily attach and detach the battery packs BP to and from the battery attaching unit 62.

The working machine 2 further comprises the cover 96 attached to the body housing 94 and configured to pivot between the closed position and the open position, the cover 96 defining the battery accommodating space 114 in which the battery packs BP are accommodated between the body housing 94 and the cover 96 when the cover 96 is in the closed position. The cover 96 opens from the rear side toward the front side when the cover 96 pivots from the closed position toward the open position about the pivot axis RX of the cover 96.

According to the above configuration, the user can easily attach and detach the battery packs BP to and from the battery attaching unit 62 when the user is standing behind the working machine 2 and pivots the cover 96 from the closed position to the open position.

The center of gravity G1 of the battery packs BP is disposed on the front side relative to the rotary axis AX1 of the rotor 216 when the working machine 2 is on the ground P in the working posture.

According to the above configuration, the working machine 2 can be suppressed from tilting rearward.

The center of gravity G1 of the battery packs BP is disposed on the front side relative to the rotary axis AX3 of the working unit 10 when the working machine 2 is on the ground P in the working posture.

According to the above configuration, the working machine 2 can be suppressed from tilting rearward due to the vibration of the working unit 10.

The working machine 2 further comprises the handle unit 6 configured to be gripped by a user. The working machine 2 is a walk behind working machine configured to be moved by the user pushing the handle unit 6 frontward.

Generally, in a walk behind working machine, maneuverability by the user of the working machine 2 deteriorates when the working unit 10 lifts off from the ground P. According to the above configuration, since the working unit 10 can be suppressed from lifting off from the ground P e, deterioration in the maneuverability of the working machine 2 can be suppressed even in such walk behind working machine.

The working machine 2 is configured to work by moving on the ground P. The working machine 2 further comprises: the fan 204 configured to be rotated by the electric motor 200; and the housing unit 60 accommodating the electric motor 200 and the fan 204. The transmitting unit 202 (example of axis changing part) is configured to transmit the rotation of the electric motor 200 to the working unit 10 to change a direction of the rotary axis AX3 of the working unit 10 to a direction different from a direction of the rotary axis AX1 of the electric motor 200. The housing unit 60 includes: the air inlets 112 through which air flows from outside the housing unit 60 into the housing unit 60 by rotation of the fan 204; and the air outlet 184 through which air fed out by the fan 204 flows from inside the housing unit 60 to outside the housing unit 60. The air outlet 184 communicates with the lower space 188 (example of a space) on the working unit 10 side.

According to the above configuration, air outputted from the air outlet 184 flows toward the working unit 10 to contact the ground P. Due to this, the air outputted from the air outlet 184 can be suppressed from blowing onto the user.

The housing unit 60 comprises the separating wall part 174 disposed between the electric motor 200 and the working unit 10.

According to the above configuration, the upper space 190 on the electric motor 200 side and the lower space 188 on the working unit 10 side can be separated with a simple configuration providing the separating wall part 174.

The air outlet 184 is disposed on the working unit 10 side relative to the separating wall part 174.

According to the above configuration, the air flowing out of the air outlet 184 can be suppressed by the separating wall part 174 from flowing from the lower space 188 on the working unit 10 side to the upper space 190 on the electric motor 200 side. Due to this, the air flowing out of the air outlet 184 can be further suppressed from blowing onto the user.

The air inlets 112 are disposed on the electric motor 200 side relative to the separating wall part 174.

Sand and/or dust from the ground P may enter into the lower space 188 on the working unit 10 side. According to the above configuration, such entry of the sand and/or dust into the housing unit 60 through the air inlets 112 can be suppressed.

The housing unit 60 comprises the body housing 94 accommodating the electric motor 200 and the fan 204. The body housing 94 is separate from the separating wall part 174.

According to the above configuration, the separating wall part 174 can be easily replaced according to the configuration of the working unit 10.

The body housing 94 comprises: the upper body housing 100 (example of a first body housing) accommodating the electric motor 200; and the lower body housing 102 (example of a second body housing) being separate from the upper body housing 100 and accommodating the fan 204.

According to the above configuration, the combination of the electric motor 200 and the fan 204 can be easily changed.

The air inlets 112 are open downward.

According to the above configuration, entry of liquid such as rain into the housing unit 60 through the air inlets 112 can be suppressed.

Air flows in the housing unit 60 from the air inlets 112 to the air outlet 184 when the fan 204 rotates. The working machine 2 comprises the control unit 196 disposed between the air inlets 112 and the electric motor 200 in a flowing direction of air and configured to control the electric motor 200.

According to the above configuration, cooling ability for the control unit 196 can be enhanced.

The fan 204 is a centrifugal fan.

According to the above configuration, the flow rate of the air fed out from the fan 204 can be increased.

(Variants)

In an embodiment, the working machine 2 may be a scarifier and/or dethatcher for lawn, or a snow remover. The working machine 2 may be an electric brush configured to remove dirt by rotation of brushes or an electric sweeper configured to remove dirt/stain and/or cut lawn by rotation of a drum having plural rubber blades.

The working machine 2 in an embodiment may comprise built-in batterie(s) instead of the battery packs BP. At this occasion, the built-in batterie(s) are recharged by being connected to an external power supply via a connecting cord. The built-in batterie(s) are accommodated in the housing unit 60.

The working machine 2 in an embodiment may comprise a backpack battery instead of the battery packs BP. The backpack battery is configured to be detachably attached to a back board carried on a back of the user. The backpack battery is mounted on an upper surface of the upper body housing 100.

The working machine 2 in an embodiment may not comprise the pair of wheels 24.

In the transmitting unit 202 in an embodiment, the jaw coupler 232 may have a thread defined at a lower end of the second member 256 or a vicinity thereof, and a bevel gear may mesh with the thread. Due to this, the direction of the rotary axis is changed from the direction of the rotary axis AX1 of the jaw coupler 232 (up-down direction) to the left-right direction. Thereafter, the rotation of the bevel gear may be transmitted to the output shafts 246, 248 via a belt or a spur gear.

The body unit 8 in an embodiment may not comprise the partitioning member 122. In this configuration, the accommodating space 120 is not divided into the upper accommodating space 124 and the lower accommodating space 126.

In the housing unit 60 in an embodiment, the upper body housing 100 and the lower body housing 102 may be integrated. The separating wall part 174 of the fender 98 may be detachably attached to the lower body housing 102. The fender 98 may not comprise the surrounding wall part 170 and the bottom wall part 172.

In the housing unit 60 in an embodiment, the lower body housing 102 and the separating wall part 174 of the fender 98 may be integrated.

In the housing unit 60 in an embodiment, the lower body housing 102 and the surrounding wall part 170 and the bottom wall part 172 of the fender 98 may be integrated. In this configuration, the separating wall part 174 of the fender 98 may be detachably attached to the lower body housing 102.

In the lower body housing 102 in an embodiment, the throughhole 145 may serve as an air outlet through which air flows outside the housing unit 60.

The fan 204 in an embodiment may be an axial fan.

What is claimed is:

1. A working machine configured to work by moving frontward on a ground, the working machine comprising:
- a battery;
- an electric motor comprising a stator and a rotor and configured to be driven by electric power supplied from the battery;
- a working unit configured to work on the ground by being rotated about a rotary axis by the electric motor, the rotary axis being substantially parallel to a virtual ground perpendicular to an up-down direction; and
- a transmitting unit configured to transmit rotation of the electric motor to the working unit, wherein
- when the working machine is viewed from a front side with the working machine being in a working posture on the ground, the battery, the electric motor, and the working unit are separate from each other in the up-down direction and the working unit is disposed below the battery and the electric motor,
- the working unit comprises:
- a rotating member configured to rotate about a rotary axis; and
- a plurality of working claws configured to rotate with the rotating member, and
- when the working machine is viewed from above with the working machine being in the working posture on the ground, the battery overlaps the electric motor and the rotating member, and the electric motor overlaps the rotating member.

2. The working machine according to claim 1, wherein the transmitting unit comprises:
- a first transmitting shaft configured to be rotated by the electric motor;
- a jaw coupler connected to the first transmitting shaft; and
- a second transmitting shaft configured to transmit rotation of the first transmitting shaft to the working unit via the jaw coupler.

3. The working machine according to claim 2, wherein the jaw coupler comprises a coupling member constituted of a resin material.

4. The working machine according to claim 1, further comprising:
- a body housing accommodating the electric motor; and
- a battery attaching unit attached to the body housing and to which the battery is detachably attached, wherein
- an attaching direction in which the battery is attached to the battery attaching unit is inclined relative to the virtual ground and is oriented toward the ground.

5. The working machine according to claim 4, further comprising a cover attached to the body housing and configured to pivot between a closed position and an open position, the cover defining a battery accommodating space in which the battery is accommodated between the body housing and the cover when the cover is in the closed position, wherein
- the cover opens from a rear side toward the front side when the cover pivots from the closed position toward the open position about a pivot axis of the cover.

6. The working machine according to claim 1, wherein a center of gravity of the battery is disposed on the front side relative to a rotary axis of the rotor when the working machine is on the ground in the working posture.

7. The working machine according to claim 1, wherein a center of gravity of the battery is disposed on the front side relative to the rotary axis of the working unit when the working machine is on the ground in the working posture.

8. The working machine according to claim 1, further comprising a handle unit configured to be gripped by a user, wherein
- the working machine is a walk-behind working machine configured to be moved by the user pushing the handle unit frontward.

9. The working machine according to claim 1, further comprising:
- a fan configured to be rotated by the electric motor; and
- a housing unit accommodating the electric motor and the fan, wherein
- the transmitting unit comprises an axis changing part configured to change a direction of the rotary axis of the working unit to a direction different from a direction of a rotary axis of the electric motor,
- the housing unit includes:

an air inlet through which air flows from outside the housing unit into the housing unit by rotation of the fan; and an air outlet through which air fed out by the fan flows from inside the housing unit to outside the housing unit, and the air outlet communicates with a space on a working unit side.

10. The working machine according to claim 9, wherein the housing unit comprises a separating wall part disposed between the electric motor and the working unit.

11. The working machine according to claim 10, wherein the air outlet is disposed on the working unit side relative to the separating wall part.

12. The working machine according to claim 11, wherein the air inlet is disposed on an electric motor side relative to the separating wall part.

13. The working machine according to claim 10, wherein the housing unit comprises a body housing accommodating the electric motor and the fan, and the body housing is separate from the separating wall part.

14. The working machine according to claim 13, wherein the body housing comprises:

a first body housing accommodating the electric motor; and a second body housing being separate from the first body housing and accommodating the fan.

15. The working machine according to claim 9, wherein the air inlet is open downward.

16. The working machine according to claim 9, wherein air flows in the housing unit from the air inlet to the air outlet when the fan rotates, and the working machine comprises a control unit disposed between the air inlet and the electric motor in a flowing direction of air and configured to control the electric motor.

17. The working machine according to claim 9, wherein the fan is a centrifugal fan.

18. The working machine according to claim 3, further comprising:

a body housing accommodating the electric motor; and a battery attaching unit attached to the body housing and to which the battery is detachably attached, wherein an attaching direction in which the battery is attached to the battery attaching unit is inclined relative to the virtual ground and is oriented toward the ground, the working machine further comprises a cover attached to the body housing and configured to pivot between a closed position and an open position, the cover defining a battery accommodating space in which the battery is accommodated between the body housing and the cover when the cover is in the closed position, the cover opens from a rear side toward the front side when the cover pivots from the closed position toward the open position about a pivot axis of the cover, a center of gravity of the battery is disposed on the front side relative to a rotary axis of the rotor when the working machine is on the ground in the working posture, the center of gravity of the battery is disposed on the front side relative to the rotary axis of the working unit when the working machine is on the ground in the working posture, the working machine further comprises a handle unit configured to be gripped by a user, the working machine is a walk behind working machine configured to be moved by the user pushing the handle unit frontward, the working machine further comprises:

a fan configured to be rotated by the electric motor; and a housing unit accommodating the electric motor and the fan, the transmitting unit comprises an axis changing part configured to change a direction of the rotary axis of the working unit to a direction different from a direction of a rotary axis of the electric motor, the housing unit includes:

an air inlet through which air flows from outside the housing unit into the housing unit by rotation of the fan; and an air outlet through which air fed out by the fan flows from inside the housing unit to outside the housing unit, the air outlet communicates with a space on a working unit side, the housing unit comprises a separating wall part disposed between the electric motor and the working unit, the air outlet is disposed on the working unit side relative to the separating wall part, the air inlet is disposed on an electric motor side relative to the separating wall part, the housing unit comprises the body housing accommodating the electric motor and the fan, the body housing is separate from the separating wall part, the body housing comprises:

a first body housing accommodating the electric motor; and a second body housing being separate from the first body housing and accommodating the fan, the air inlet is open downward, air flows in the housing unit from the air inlet to the air outlet when the fan rotates, the working machine comprises a control unit disposed between the air inlet and the electric motor in a flowing direction of air and configured to control the electric motor, and the fan is a centrifugal fan.

19. The working machine according to claim 1, wherein the battery and the rotating member are disposed on a rotary axis of the rotor of the electric motor.

20. The working machine according to claim 2, wherein when the working machine is in the working posture on the ground, a rotary axis of the second transmitting shaft is disposed on a front side relative to a rotary axis of the rotor of the electric motor and the rotary axis of the working unit is disposed on a rear side relative to the rotary axis of the rotor of the electric motor.

* * * * *